(12) United States Patent
Theising et al.

(10) Patent No.: US 6,715,979 B1
(45) Date of Patent: Apr. 6, 2004

(54) ADJUSTABLE LIFT DOLLY

(75) Inventors: John L. Theising, St. Peters, MO (US); Randall W. Robison, O'Fallon, MO (US)

(73) Assignee: Home Depot U.S.A., Inc., Atlanta, GA (US)

( * ) Notice: Subject to any disclaimer, the term of this patent is extended or adjusted under 35 U.S.C. 154(b) by 0 days.

(21) Appl. No.: 10/365,119

(22) Filed: Feb. 12, 2003

(51) Int. Cl.[7] .................................................. B60P 1/02
(52) U.S. Cl. ........................ 414/458; 414/495; 246/647
(58) Field of Search ................. 414/458, 495; 248/647

(56) References Cited

U.S. PATENT DOCUMENTS

| | | | |
|---|---|---|---|
| 2,937,850 A | 5/1960 | Winkler | 254/8 |
| 3,845,933 A | 11/1974 | Heizer, Jr. | 254/8 |
| 5,018,930 A * | 5/1991 | Hardin et al. | 414/458 |
| 5,052,200 A | 10/1991 | Claar et al. | 70/123 |
| 5,308,094 A | 5/1994 | McWhorter et al. | 280/43.17 |
| 5,876,173 A | 3/1999 | English, Jr. | 414/458 |
| 5,957,649 A | 9/1999 | English, Jr. et al. | 414/458 |
| 6,079,931 A | 6/2000 | English, Jr. et al. | 414/458 |
| 6,196,785 B1 * | 3/2001 | Lanciaux, Jr. | 414/458 |
| 6,311,992 B1 | 11/2001 | Theising | 280/79.11 |
| 6,371,496 B1 * | 4/2002 | Balolia | 280/35 |
| 6,533,524 B2 * | 3/2003 | English et al. | 414/458 |

* cited by examiner

Primary Examiner—Joseph A. Dillon
(74) Attorney, Agent, or Firm—Howrey Simon Arnold & White LLP

(57) ABSTRACT

An adjustable lift dolly apparatus is described for use in repeatedly lifting and transporting objects of different shapes and sizes. A latching mechanism is described which securely latches the dolly in the lifted position and can be easily released by using a foot pedal. A counterbalance is included which prevents the lift dolly from inadvertently moving an object when the lift dolly is in the unlatched position.

28 Claims, 17 Drawing Sheets

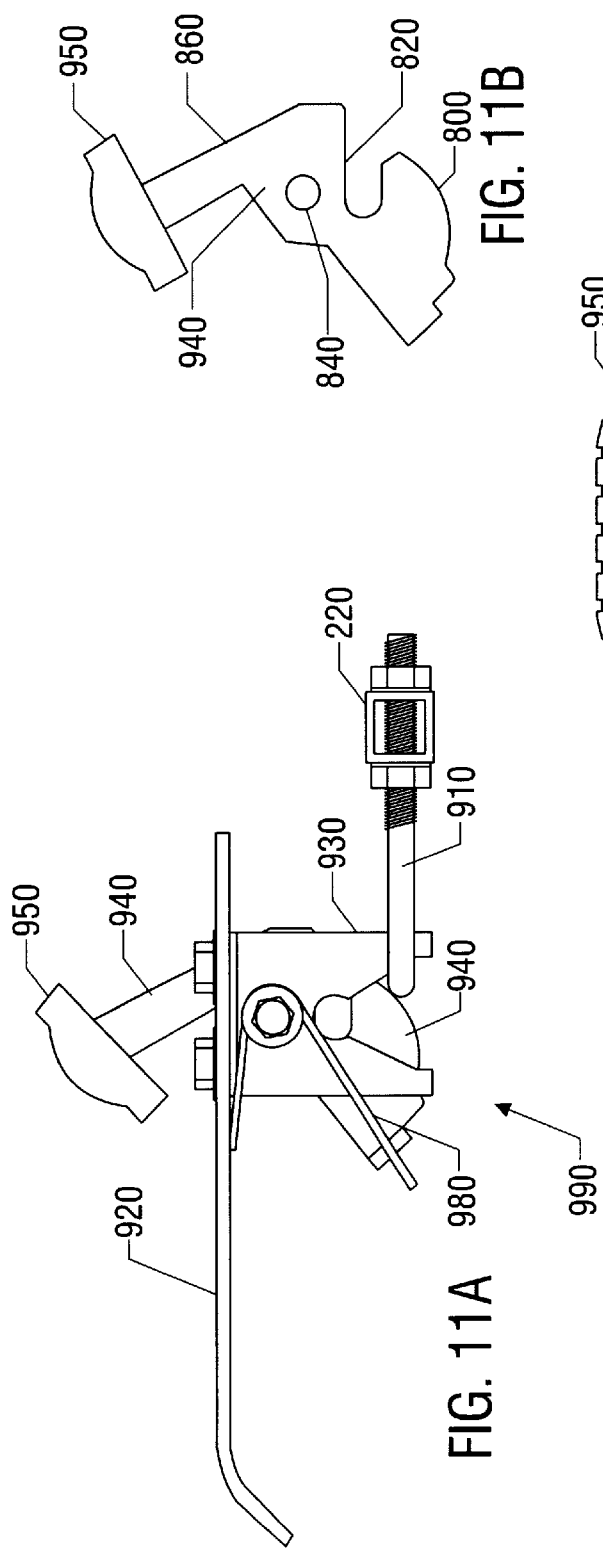

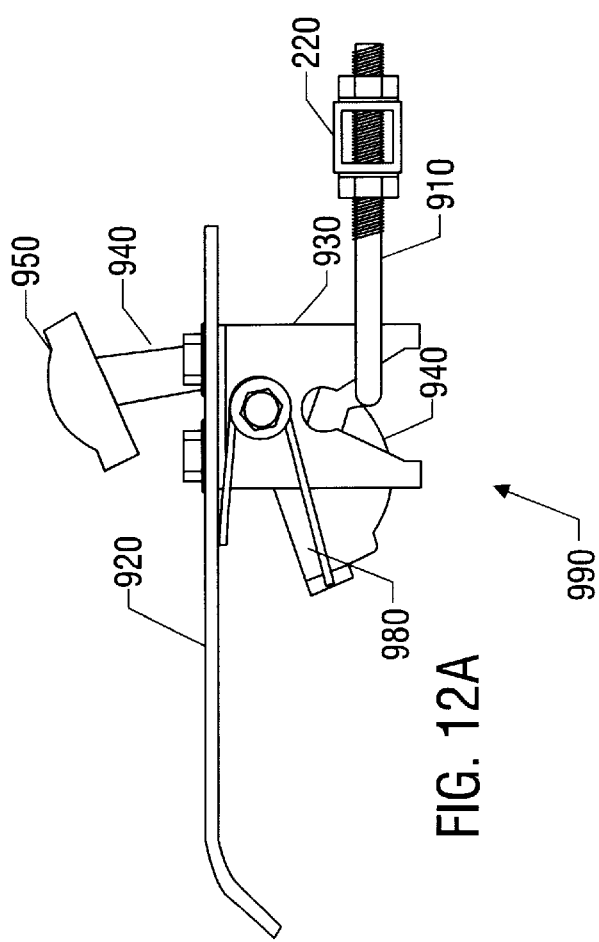
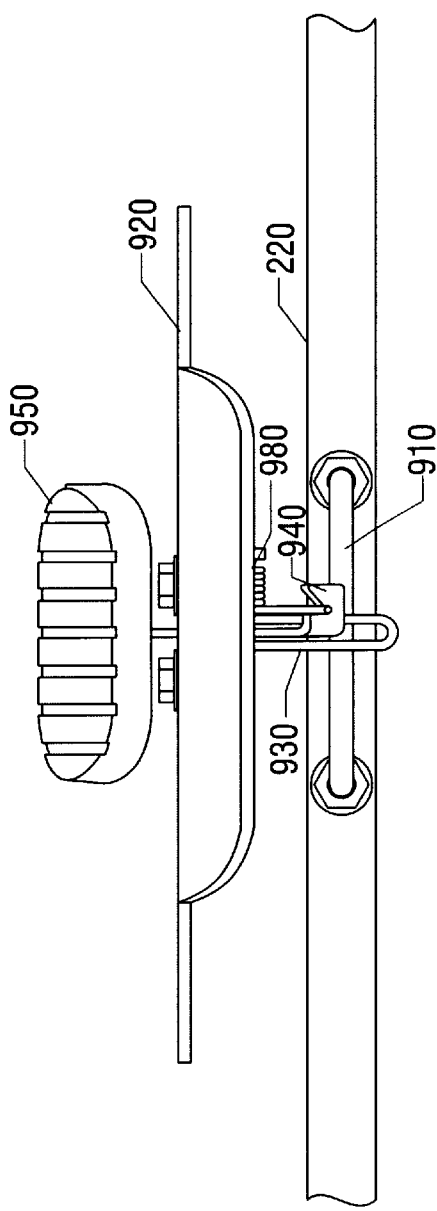
FIG. 12A
FIG. 12B

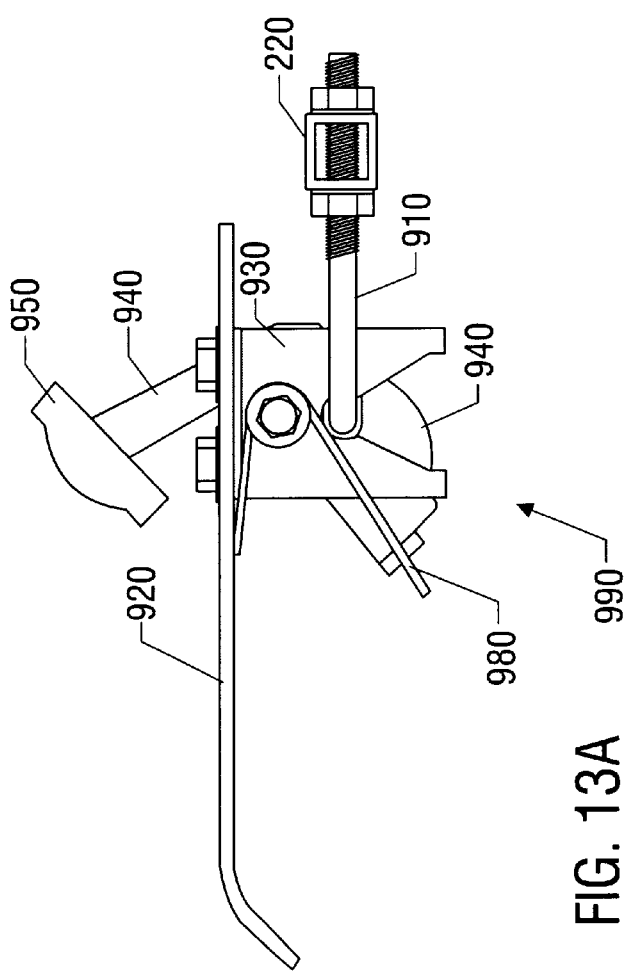
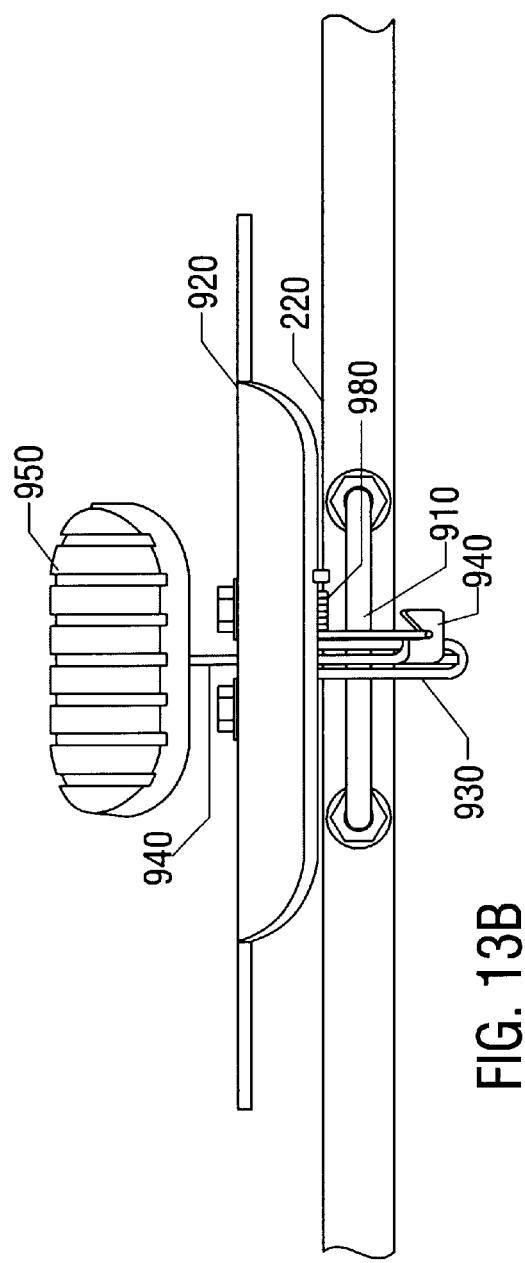
FIG. 13A
FIG. 13B

ADJUSTABLE LIFT DOLLY

CROSS-REFERENCE TO RELATED APPLICATIONS

This application is related to U.S. patent application Ser. No. 09/496,751, filed Feb. 3, 2000, entitled "Lift Dolly with Pedal Latch Mechanism," by John L. Theising, now U.S. Pat. No. 6,311,992 issued Nov. 6, 2002, which is incorporated by reference herein in its entirety.

BACKGROUND OF INVENTION

1. Field of the Invention

The invention relates to an adjustable lifting device for moving objects which may be heavy. More particularly, this invention relates to a lifting device such as a lift dolly or castor assembly which is adjustable such that it may be adapted for use with a variety of objects of different sizes, such as tools and tool stands, e.g. The invention further relates to an improved adjustable lifting device that includes a counterbalance to improve the performance of the lifting device.

2. Description of the Related Art

Often it is desirable to move objects, such as heavy equipment, in a timely fashion. Many devices are available for moving equipment on the factory floor or in a workshop. Some devices such as cranes are capable of transporting and lifting extremely heavy equipment. However, cranes are generally expensive and complex.

Alternatively, simple dollies that pivot about an axle are extremely portable and easy to use. However, these simple dollies are not capable of moving heavy equipment.

Therefore, it is desirable to provide a machine that is capable of lifting and moving heavy equipment in a simple method and timely fashion.

One attempt at providing such a lift dolly is disclosed in U.S. Pat. No. 5,876,173 English, incorporated by reference in its entirety herein. While the invention described in U.S. Pat. No. 5,876,173 is capable of lifting and transporting machine tools, it has been discovered that the latching mechanism may be difficult for a user to properly align, thus leading to an insecure lift.

Another attempt at providing such a lift dolly is disclosed in U.S. Pat. No. 5,957,649 to English, Stahl, and Hees, incorporated by reference in its entirety herein. While the invention described in U.S. Pat. No. 5,957,649 is also capable of lifting and transporting machine tools, it has also discovered that the toggle-type spring latching mechanism may prove to be unreliable to consistently latch and unlatch the dolly frames.

Therefore, it is also desirable to allow a user to align the latching mechanism in a robust, reliable manner. It is also desirable to provide a simple, robust, reliable latching mechanism which can be easily disengaged by a user to set the load down on the floor, without the use of power or hand tools.

For the foregoing reasons, there is a need for a lift dolly that is capable of lifting relatively heavy loads and transporting these loads in a secure fashion.

Additionally, it is desired that the described lift dolly be adjustable to fit a variety of objects such as tools. For instance, it is desirable that the same lift dolly be able to move a table saw, a drill press, or a wood lathe, e.g., at the user's discretion. Thus, it is desirable that the frame of the lift dolly be adjustable.

Various attempts to provide the adjustable feature into a lift dolly are known. For instance, U.S. Pat. No. 5,957,649 to English discloses the use of telescoping tubes which create frame members 3, 4, 6, 7, and 8. Although acceptable for various applications, it was discovered that the frame members disclosed in English may fail to keep the frames level and the wheels perpendicular to the floor, which does not allow the wheels to pivot freely in all directions. Additionally, these frame members may fail when subjected to repeated loads from heavy objects because of the method by which the frame members are connected. Thus, there is a need of the lift dolly or caster to allow adjustment to permit the lift dolly or caster to fit a variety of different tools, while allowing the wheels to pivot freely in all directions. There is a need for these adjustable components that are connectable in a way that makes them more rugged and robust to be able to accommodate repeated, relatively heavy loads.

Some adjustable lifting devices may also tend to move from the stationary to object-moving position without notice: i.e. the weight of the caster frame may have a tendency to lift up on the tool as if it were set in a mobile position. Many attempts to overcome this issue are known. For instance, U.S. Pat. No. 5,876,173 to English discloses the use of connection rods 44 or energy absorbing gas struts to counter balance the weight of the frame. However, this English design may require a precision hinge mounting means to the frame, which may prove difficult to adapt the caster to different types of standard tool legstands. Thus, there is a need for a counterbalance for a tool stand that is easily adaptable to different sizes of standard tool legstands which prevents the lift dolly from lifting up on the tool itself. Additionally, it is desirable that the amount of tension holding be adjustable, and that the counterbalance be economical.

The claimed invention is directed overcoming, or at least minimizing, disadvantage of the prior art.

SUMMARY OF THE INVENTION

The invention relates to an adjustable apparatus for lifting and transporting an object. In some embodiments, the lift dolly employs a pedal latch mechanism that attaches to a U-bolt to securely lock the lift dolly in the position of lifting a heavy object. Use of this pedal latch securely provides a secure attachment of the frames of the lift dolly, thus ensuring that the heavy object will not be dropped. Further, once the object has been moved to a desired new location, a user may depress the pedal on the latching mechanism to easily lower the object. Because the pedal latch may be disengaged by the user's foot pushing on the pedal, the user may easily and quickly disengage the lifting mechanism.

In some embodiments, an adjustable lift dolly for lifting and moving objects of different sizes is described having an adjustable first frame having an apex, a rear support assembly with an adjustable length, a plurality of first pivot ends connectable to the object, and a first pair of castors extending downwardly from the adjustable first frame; an adjustable second frame having a center support assembly with an adjustable length, a U-bolt support assembly having an adjustable length, a plurality of second pivot ends connectable to the object, and a second pair of castors extending downwardly from the second frame; a latching mechanism for releasably securing the adjustable first frame to the adjustable second frame, having a footplate attached to said first frame, the adjustable first frame being connectable to the adjustable second frame such that when a downward force is exerted on the apex of the adjustable first frame, the adjustable first frame pivots relative to the first pair of castors thus moving the first pivot ends of the adjustable first frame in an upward direction, said downward force on the adjustable first frame causing the adjustable first frame to exert a downward force on the center support assembly of the second frame, thus causing the second frame to pivot relative to the second pair of castors, thus moving the second pivot ends of the adjustable second frame in an upward direction, the upward movement of the of the first and second pivot ends thereby lever-lifting the object; and a foot pedal attached to the latching mechanism, the foot pedal being functionally associated with the latching mechanism such that by depressing the foot pedal, the latching mechanism disconnects the first frame from the second frame, wherein at least one of the lengths of the rear support assembly, center support assembly, or U-bolt support assembly is varied to accommodate objects of different sizes.

In some aspects the rear support assembly further comprises a rear member having two ends, and a plurality of first mounting members attached to the first frame, each end of the rear member being releaseably, telescopically mounted within one of the plurality of first mounting members such that the length of the rear support assembly may be varied. The rear members may be releaseably, telescopically mounted within one of the plurality of first mounting members by adjusting means for adjusting the length of the rear support assembly. The adjusting means may be an outward extruded hole in the plurality of first mounting members, a set screw and lock nut being threaded into the tapped, outward extruded hole to contact the rear member.

In some embodiments, the first adjustable frame has a plurality of first frame sides, each having an adjustable length; the plurality of first mounting members may be selectively secured to the first plurality of first frame sides by attachment means; and the attachment means further comprises each first frame side comprising a plurality of holes that mate with a hole with each of the first mounting members. An extension may be telescopically mountable within each first frame side.

In some embodiments, the center support assembly is a center support member having two ends; and a plurality of second mounting members attached to the second frame, each end of the center support member being releaseably, telescopically mounted within one of the plurality of second mounting members such that the length of the center support assembly may be varied.

In some embodiments, the U-bolt support assembly further comprises a U-bolt support member having two ends; and a plurality of third mounting members attached to the second frame, each end of the U-bolt support member being releaseably, telescopically mounted within one of the plurality of third mounting members such that the length of the U-bolt support assembly is adjustable. The second adjustable frame may have two frame sides, each having an adjustable length.

Also described is a counterbalance. The counterbalance may be a spring connected to the center support assembly and connectable to the object to bias the lift dolly weight from applying the upward movement to lever lift the object. The spring may be connectable to the object via an s-hook passing through one of a plurality of links in a chain, the tension in the spring being adjustable by moving the s-hook into another one of the plurality of links in the chain.

The invention also relates to a method of lifting and moving a first object from a first location to a second location and lifting and moving a second object from a third location to a fourth location.

BRIEF DESCRIPTION OF THE DRAWINGS

FIGS. 11A–C shows a cam latch mechanism of one embodiment of the present invention.

FIGS. 12A–B show the pedal latching mechanism of that shown in FIG. 11, engaging a U-bolt.

FIGS. 13A–B show the functioning of the pedal latching mechanism of one embodiment of the present invention in a latched mode.

Figure 1A:
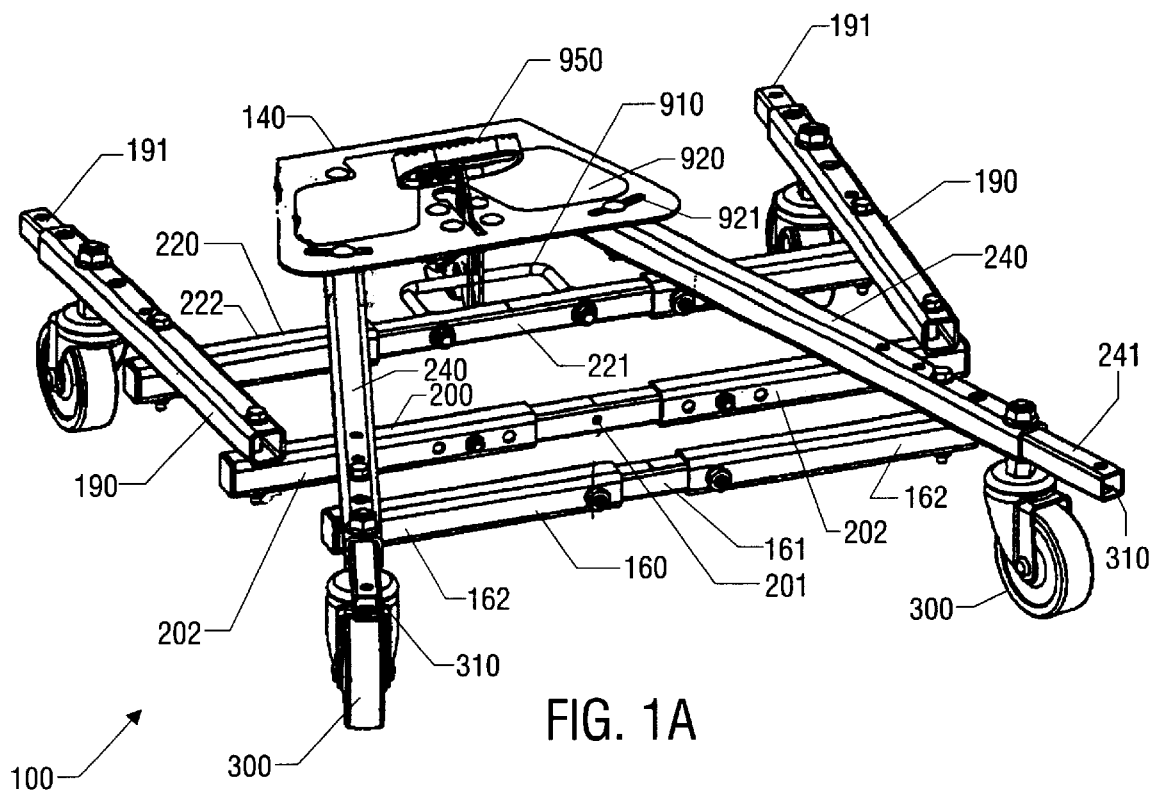
FIG. 1A is an isometric view of the lift dolly of one embodiment of the present invention with the latching mechanism latched.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

For instance, while it is mentioned that the lift dolly may lift and/or move objects such as tools or tool stands, the invention is not so limited, as the same dolly may be utilized for moving any number of objects, such as medical devices, furniture, etc.

DESCRIPTION OF ILLUSTRATIVE EMBODIMENTS

The invention relates to an adjustable apparatus for lifting and transporting an object. In some embodiments, the lift dolly is adjustable such that it may be utilized to move objects of different sizes. In some embodiments, this is accomplished in a way such that the various adjustable members of lift dolly are robust and sturdy, allowing for repeated loading. In some embodiments, the lift dolly employs a pedal latch mechanism that attaches to a U-bolt to securely lock the lift dolly in the position of lifting a heavy object. Use of this pedal latch provides a secure attachment of the adjustable frames of the lift dolly, thus ensuring that the heavy object will not be dropped. Further, once the object has been moved to a desired new location, a user may depress the pedal on the latching mechanism to easily lower the object. Because the pedal latch may be disengaged by the user's foot pushing on the pedal, the user may easily and quickly disengage the lifting mechanism.

Further, in some embodiments, a counterbalance is included which prevents the lift dolly from tending to lift up on the tool as if it were in the mobile position, even when the latching mechanism is unlatched.

In some embodiments of the invention, a bracket is included which helps to guide a locking member, or a U-bolt, into locking position. The bracket can be V-shaped, and could also be integrally formed in the footplate by lancing tabs directly into the footplate, for example. In some embodiments, the footplate contains at least one slot, which accommodate the various adjustable members of the frames of some embodiments. Further, the locking member or U-bolt may be adjustably attached to the lift dolly to allow of the latching mechanism to be utilized in a secure fashion in spite of manufacturing tolerance stack-up.

Illustrative embodiments of the invention are described below as they might be employed in the use lifting and/or transporting objects of different sizes, such as a machine tools, for example. In the interest of clarity, not all features of an actual implementation are described in this specification. It will of course be appreciated that in the development of any such actual embodiment, numerous implementation-specific decisions must be made to achieve the developers' specific goals which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1B:
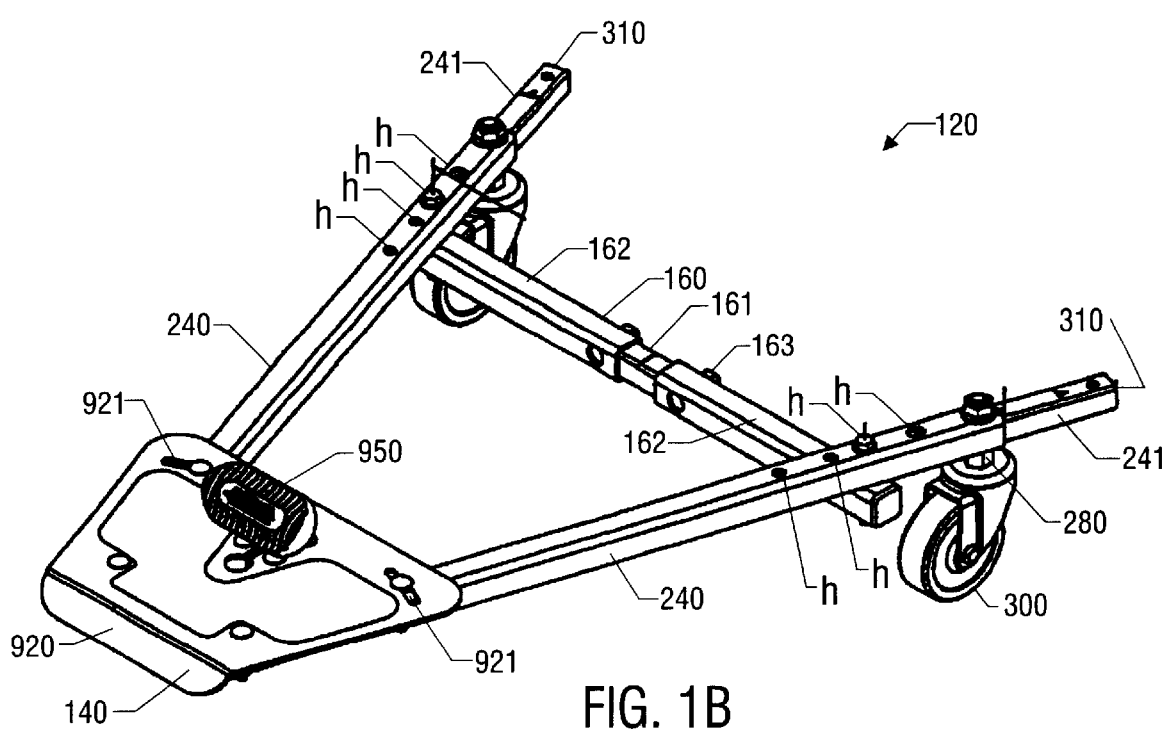
FIGS. 1B and 1C show the first frame 120 and second frame 180 respectively of one embodiment of the present invention.
Figure 1C:
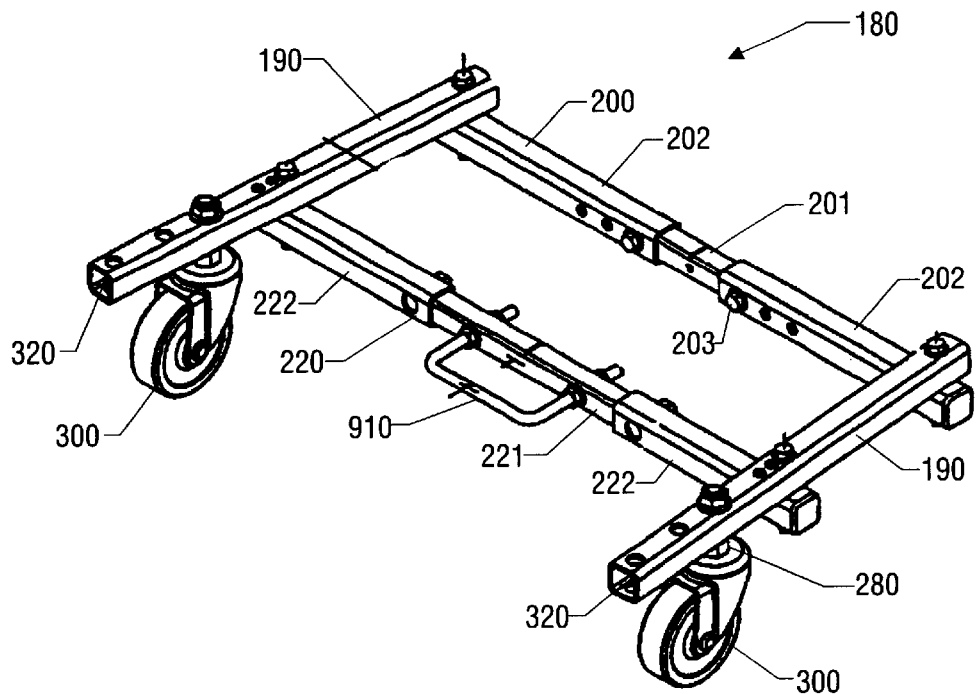

Embodiments of the invention will now be described with reference to the accompanying figures. Referring to FIGS. 1A–C, it can be seen that lift dolly 100 is generally comprised of a first frame 120 and a second frame 180. As shown in FIGS. 1A and B, first frame 120 is substantially triangular in shape and consists of a rear support assembly 160 and two first frame sides 240 which form apex 140. Footplate 920 is attached to apex 140 of first frame 120. The footplate 920 is provided with slots 921 which allow for the lift dolly 100 to be adjustable, as described more fully hereinafter. Foot pedal 950 is attached to footplate 920 as described hereinafter. On the other end of the first frame 120 are first pivot ends 310 located at the end of the first frame sides 240.

In this embodiment, the rear support assembly 160 and the two first frame sides 240 each have lengths which are each adjustable. For instance, in this embodiment, the rear support assembly 160 is comprised of a rear member 161, each end of the rear member being telescopically mounted within first mounting members 162. Adjusting means, such as a set screw and/or a hex nut 163 passing through a hole, may be used to selectively secure the rear member 161 within the two first mounting members 162, thus selectively adjusting the length of the rear support assembly 160 to a desired value. The rear member may comprise a 12" metal tube, and the first mounting members 162 may comprise 8" metal tubes, although any type, shape, and length, etc. of materials may be utilized to achieve the desired function.

Each first mounting member 162 is attachable to each first frame side 240 by attachment means. In this embodiment, the each first frame side 240 comprises a plurality of holes "h" through which a bolt may pass to attach to the first mounting member 162. The first frame 120 is capable of accommodating the differing lengths of the rear support assembly 160 by securing each first mounting member 162 to each first frame side 240 via different holes "h" along the first frame side 240. Further, by placing holes in a proper location within the first frame side 240, any length of rear support assembly 160 may be accommodated.

Additionally in this embodiment, the length of each first frame side 240 is also adapted to be adjustable such that the lift dolly 100 may be utilized to lift and/or move objects of different sizes. For instance, each first frame side 240 may further comprise extensions 241, each extension 241 telescopically mountable within each first frame side. Each extension may comprise a plurality of holes that are alignable with mating holes in the first frame side 240 such that the extension 241 is selectively secured within the first frame side 240, thus setting the first frame side 240 at a desired length.

As the footplate 920 is bolted to the first frame 120, slots 921 are provided in the footplate 920 through which bolts may pass such that the same footplate 920 may be utilized with the different configurations of the rear support assembly 160 described above.

Anchor plates 380 are attached to the ends of frame sides 240 at the first pivot ends 310, which may or may not include extensions 241. Anchor plates 380 are used to attach lift dolly 100 to an object 1000 to be lifted (not shown in this figure).

A first pair of castor stems 280 extends downwardly from first frame 120 near the rear support assembly 160. Each castor stem 280 has a castor 300 attached to the castor stem.

Also shown in FIGS. 1A & 1C is a second frame 180 which is comprised of a center support assembly 200, a U-bolt support assembly 220, and second frame sides 190. Second frame 180 is substantially rectangular in shape. On the pivot ends 320 of second frame sides 190 may be mounted anchor plates 380 for attaching an object to be moved 1000 (not shown). A second pair of castor stems 280 extends downwardly from second frame 180 near U-bolt support assembly 220. Each castor stem 280 has a castor 300. U-bolt 910 is attached to the U-bolt support assembly 220 and can also be used to attach first frame 120 to second frame 180 via a latch mechanism hereinafter described.

In this embodiment, the U-bolt support assembly 220, the center support assembly 200, and the second frame sides 190, each have lengths which may be adjustable. For instance, in this embodiment, the center support assembly 200 may be comprised of a center support member 201, with each end of the center support member 201 being telescopically mounted within one of the plurality of second mounting members 202. Adjusting means, such as a bolt and a lock nut 203 passing through a hole, or a screw and a hex nut, e.g., may be used to selectively secure the center support member 202 within the two second mounting members 202, thus selectively adjusting the length of the center support assembly 200 to a desired value. To provide further adjustability of the length of the center support assembly 200, second mounting members 202 may be provided with a plurality of holes into which the bolt and the lock nut may be inserted to selectively secure the center support member 201 within the second mounting members 202. By selecting a different hole into which the bolt and lock nut 203 is inserted, the length of the center support assembly is altered.

The center support member 201 may comprise a 12" tube, while the second mounting members 202 may comprise 8½"

tubes, although any length and any materials known to one of skill in the art having the benefit of this disclosure, which would achieve the desired results, could be utilized. Each second mounting member 202 is connected to an end of the a second frame side 190.

Similarly, in this embodiment, the U-bolt support assembly 220 may be comprised of a U-bolt member 221, with each end of the U-bolt support member 221 being telescopically mounted within one of a plurality of third mounting members 222. Adjusting means, such as a set screw and/or a hex nut, or a bolt and/or a lock nut 203, may be used to selectively secure the U-bolt support member 221 within the two third mounting members 222, thus selectively adjusting the length of the U-bolt support assembly 220 to a desired value.

The U-bolt member 221 may comprise a 16½" tube, while the third mounting members 222 may comprise 6¾" tubes, although any length and any materials known to one of skill in the art having the benefit of this disclosure, which would achieve the desired results, could be utilized. Each third mounting member 222 is connected to the second frame side 190. To provide additional adjustability, the U-bolt support assembly 220 may be attached by passing a bolt through any one of a plurality of holes spaced along the second frame side 190, and into the U-bolt support assembly 220.

Additionally in this embodiment, the length of each second frame side 190 is also adapted to be adjustable such that the lift dolly 100 may be utilized to lift and/or move objects of different sizes. For instance, each second frame side 190 may further comprise extensions 191 (shown in FIGS. 1A, 9A and 10A), each extension 191 being telescopically mountable within each second frame side 190. Each extension 191 may comprise a plurality of holes that are alignable with mating holes in the second frame side 190 such that the extension 191 is selectively secured within the second frame side 190, thus setting the second frame side 190 to a desired length.

Figure 2:
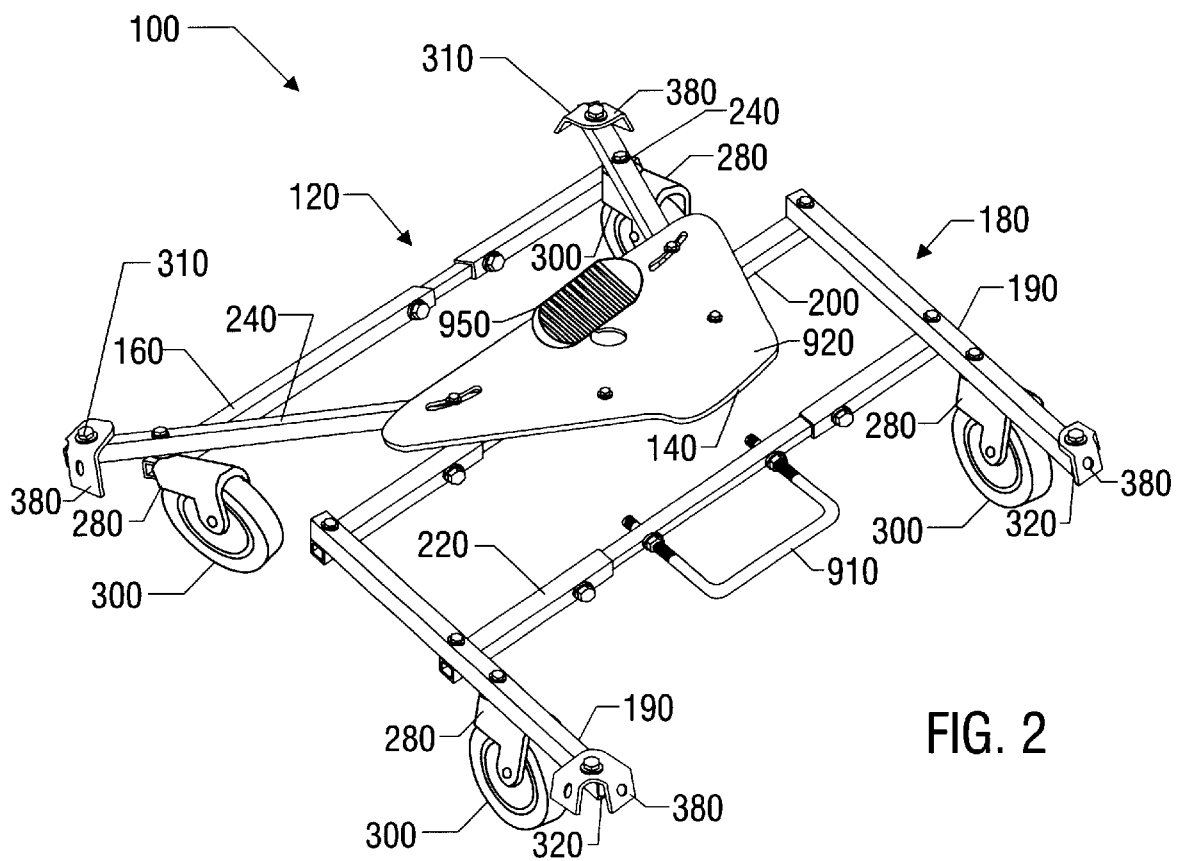
FIG. 2 is an isometric view of the lift dolly of one embodiment of the present invention with the latching mechanism unlatched.
Figure 3:
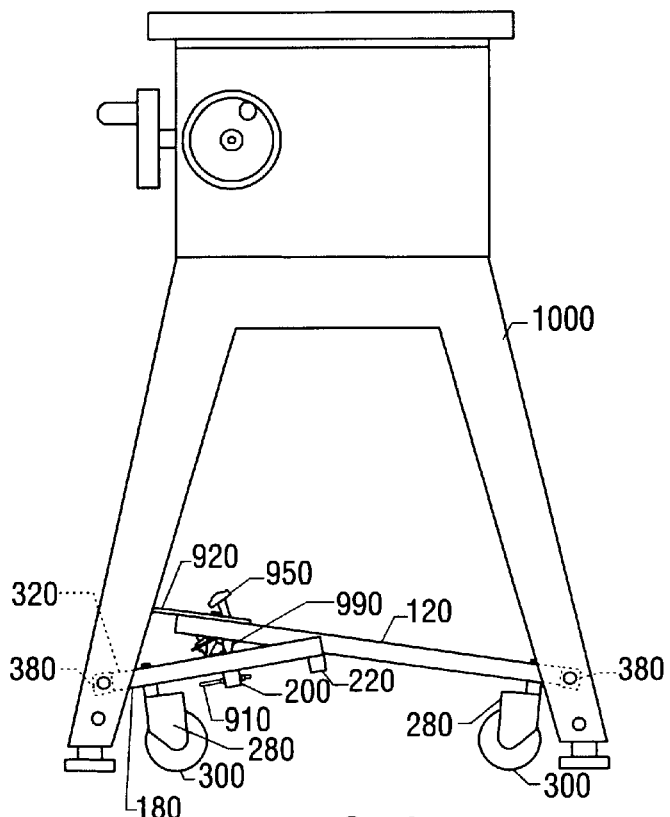
FIG. 3 shows the attachment of the lift dolly to an object to be lifted.

Referring to FIGS. 2 and 3, lift dolly 100 is shown its unlatched or open or non-lifting state. Lift dolly 100 in FIGS. 1A and 4 is shown in its latched or closed or lifting state.

Referring to FIG. 3 lift dolly 100 is shown attached to object 1000 to be lifted. Anchor plates 380 can be attached to object 1000 via any suitable attaching methods such as a bolt and nut arrangement. In order to utilize the lift dolly 100 of the present invention, the first frame 120 is positioned near an object 1000 to be lifted. Each anchor plate 380 is secured to the object 1000 and to the lift dolly 100. This securement can be accomplished in any appropriate fashion including bolting the anchor plate 380 to object 1000 and thus to the lift dolly 100. Additionally, the object 1000 could be attached to the anchor plates 380 secured to extensions 241, 191 of the lift dolly 100. Once anchor plates 38 are secured to object 1000, the castors 300 rest on the floor. Also shown in FIG. 3 is latch mechanism 990 to be described hereinafter. FIG. 3 shows the object 1000 still sitting on the floor.

Figure 4:
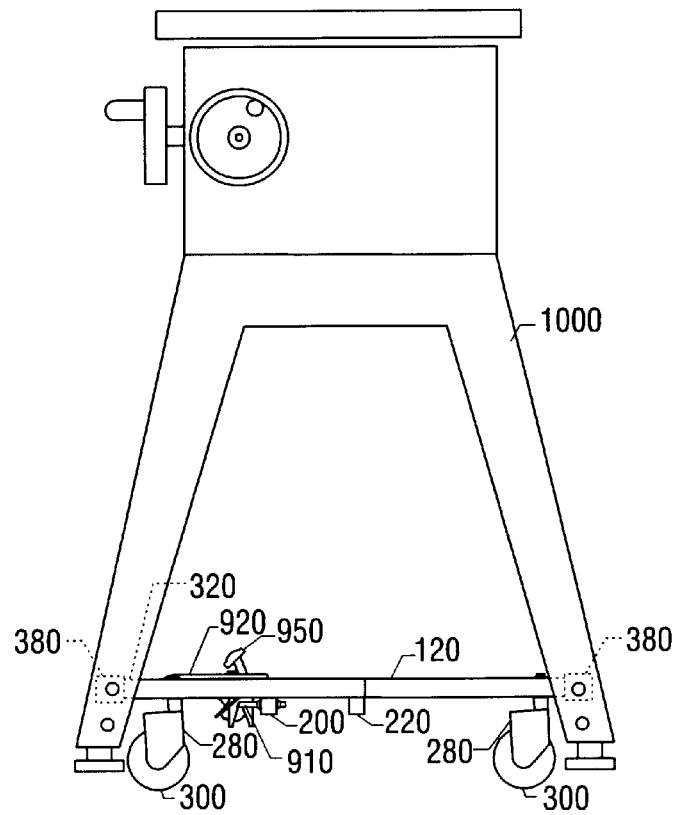
FIG. 4 shows the lift dolly lifting an object.

FIG. 4 shows object 1000 lifted off the ground. To lift object 1000, a downward pressure is exerted on footplate 920 of the first frame 120 causing the first frame 120 to rotate relative to the anchor plate 380 on the first pivot end 310. This causes the castors 300 on first frame 120 to contact the ground. With continued downward pressure exerted on footplate 920, the first frame 120 rotates about castors 300 to lift first pivot ends 310 and thus the anchor plates 380, thus raising the first end of object 1000. Exertion of downward pressure on footplate 920 also exerts pressure on second frame 180 via U-bolt support assembly 220. This downward pressure exerted on the U-bolt support assembly 220 causes second frame 180 to rotate relative to the anchor plate 380. With a continued downward articulation of second tube support 220, the second anchor plate 380 forces castors 300 to contact the ground. With continued downward pressure, the second frame 180 rotates about castors 300 thereby moving the pivot end 320 of second frame 180 in an upward direction. Since pivot end 320 is attached to object 1000 via anchor plates 380, the second end of object 1000 is lifted off the ground.

When the first and second frames are generally horizontal, the object 1000 is lifted off the ground and is ready for transport. During the lifting process, the fulcrum of the lever system moves toward the center thereby increasing the mechanical advantage of the system.

When first frame 120 and second frame 180 are horizontal, the frames can be latched with a latching mechanism 930 in cooperation with U-bolt 910 (to be discussed hereinafter). This latch system is described in FIGS. 11A–13B hereinafter.

In operation, to lower the object 1000, foot pedal 950 is depressed thereby releasing the previously secured first frame 120 from the second frame 180 thereby lowering object 1000.

Figure 5:
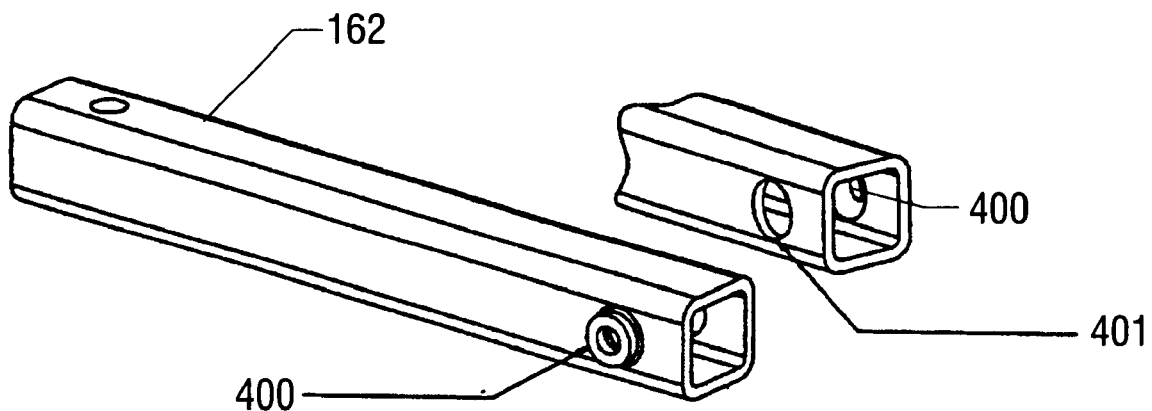
FIG. 5 shows the extruded tapped hole 400 of one embodiment of the present invention.

It has been found some telescopically-connected members are not sufficiently robust to operate to lift objects, as the telescopically-connect members may fail over time. To overcome this problem, inter alia, an improved construction related to telescopic members is disclosed. FIG. 5 shows the construction of an adjustment means of one embodiment of the telescopic members disclosed and discussed above (e.g., the rear member 161 within the first mounting member 162, the center support member 201 within the second mounting member 202, and the U-bolt support member within third mounting member 222). By way of example, the following description is directed to the rear member 161 and the first mounting member 162. However, it is equally applicable to the other telescopic members discussed above. Additionally, this method could be utilized in conjunction with attaching the extensions 241, 191 onto the respective frames.

In this embodiment, the number of threads is increased, thus improving the strength of the attachment, by using an outward extruded hole 400 in the outer tube (here the first mounting member 162). The outward extruded hole 400 may be formed by punching a clearance hole 401 in one side of the first mounting member 162. Next, an extrude-tap operation may be performed on the opposite wall of the first mounting member 162, so that the extrusion forms to the outside of the first mounting member 162 as shown in FIG. 5. This outward extruded hole 400 allows the inner tube (here, the rear member 161) to fit tightly within the first mounting member 162, yet also allows the inner tube (here, the rear member 161) to freely telescope inside the outer tube (here the first mounting member 162) with little resistance. A set screw and lock nut threaded into the tapped, outward extruded hole 400 may be used to fasten and secure the tubes (here the rear member 161 and the first mounting member 162) together. Thus, in this example, the length of the rear support assembly 160 may be adjusted accordingly.

Figure 6:
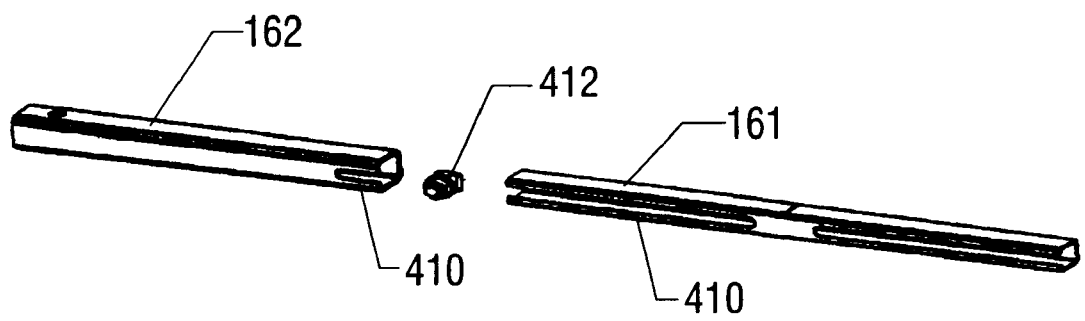
FIG. 6 shows the slots, bolt, and nut system of one embodiment of the present invention.

FIG. 6 shows additional adjustment means proving alternative ways to lock the telescoping members together: cutting slots 410 through one side of both the inner and outer tubes (i.e. the telescopic members discussed above) and fastening the parts together using square headed bolts and nuts 412 could also be used. Of course, threading the outer tube and using screws to lock the inner tube in place could also be used, as could welding a nut to the outer tube to increase the number of threads needed for strength.

Figure 7A:
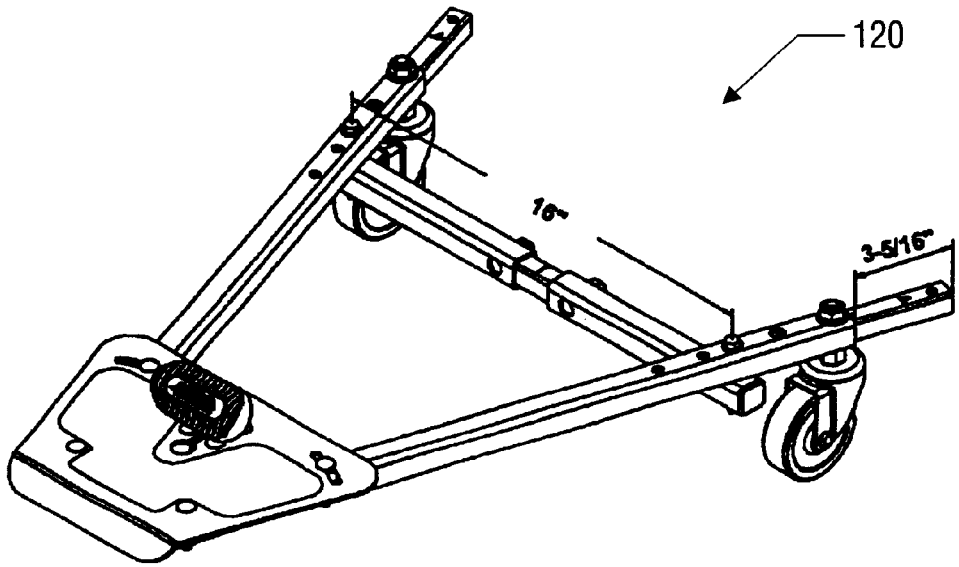
FIGS. 7A–C show the adjustable lift dolly in one given configuration for one embodiment of the present invention.
Figure 7B:
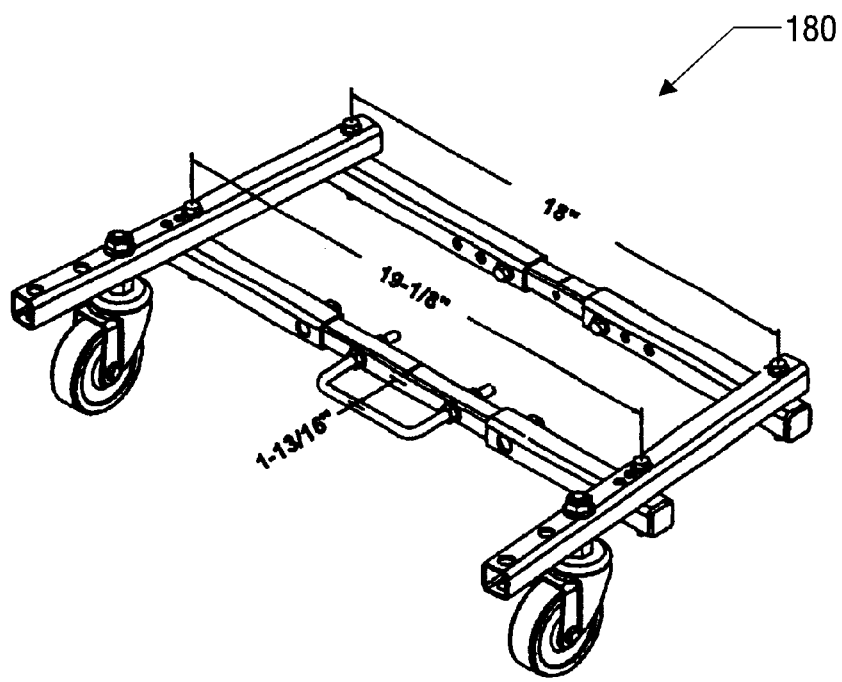
Figure 7C:
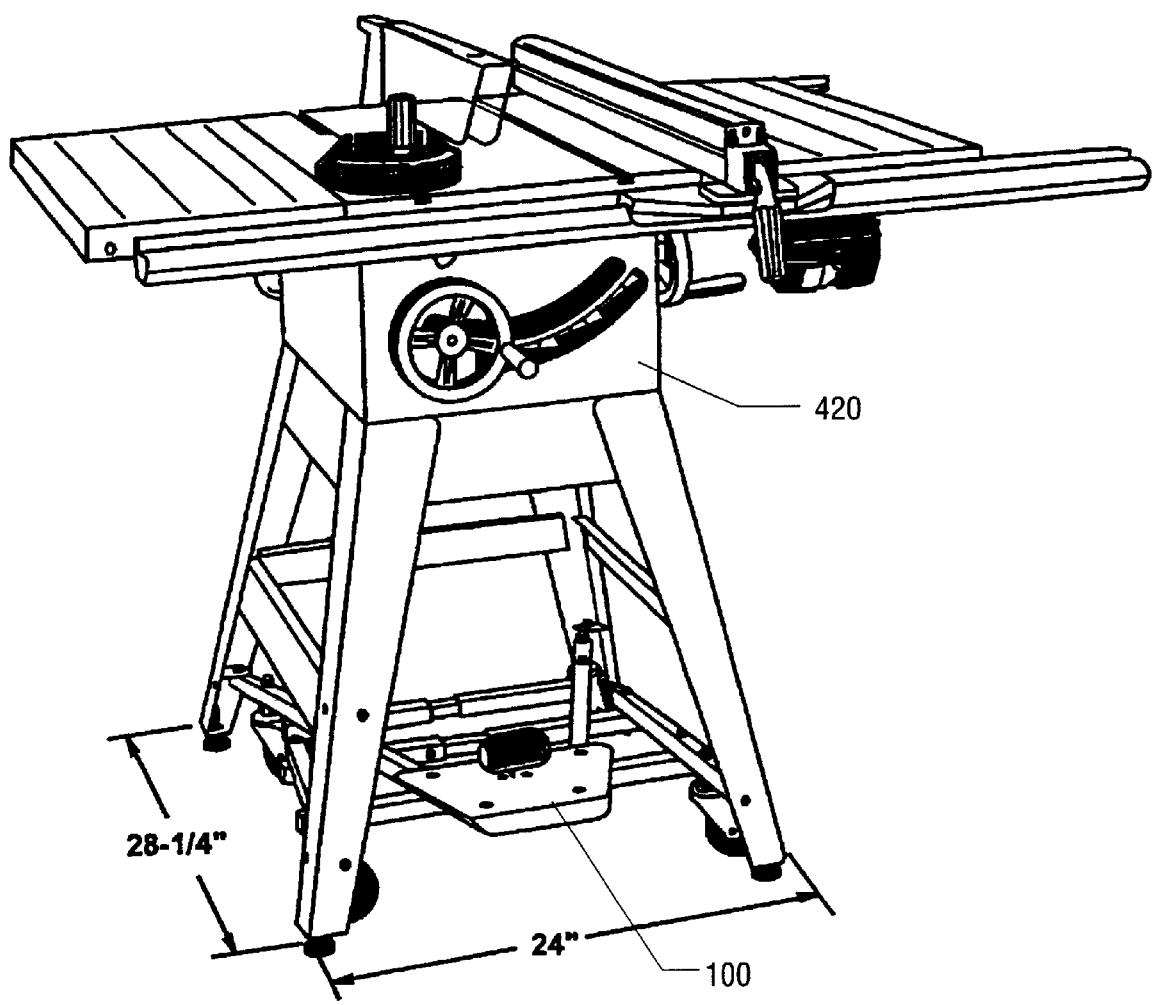
Figure 8A:
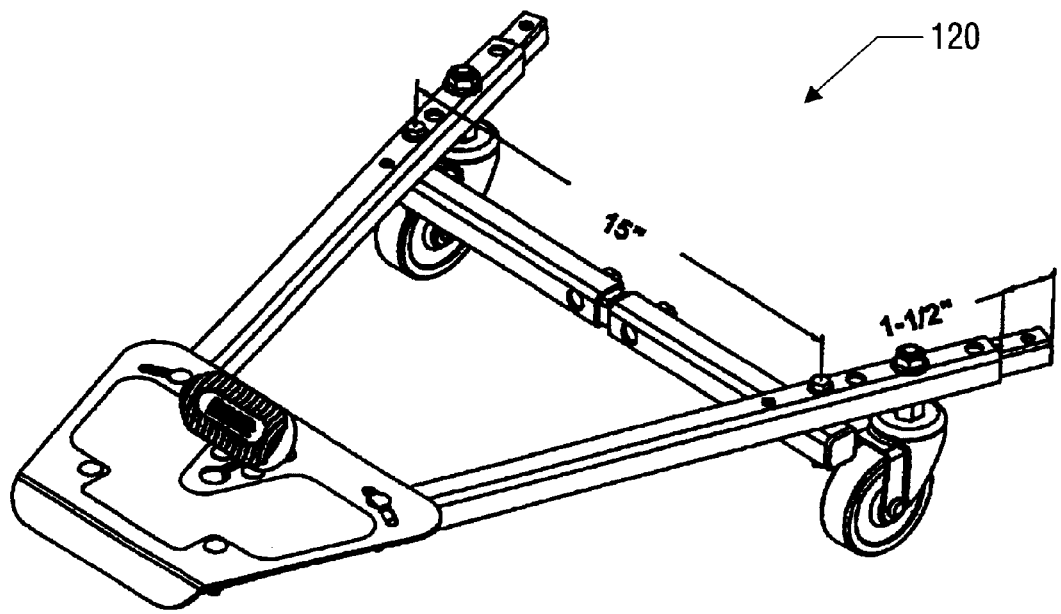
FIGS. 8A–C show the adjustable lift dolly in one given configuration for one embodiment of the present invention.
Figure 8B:
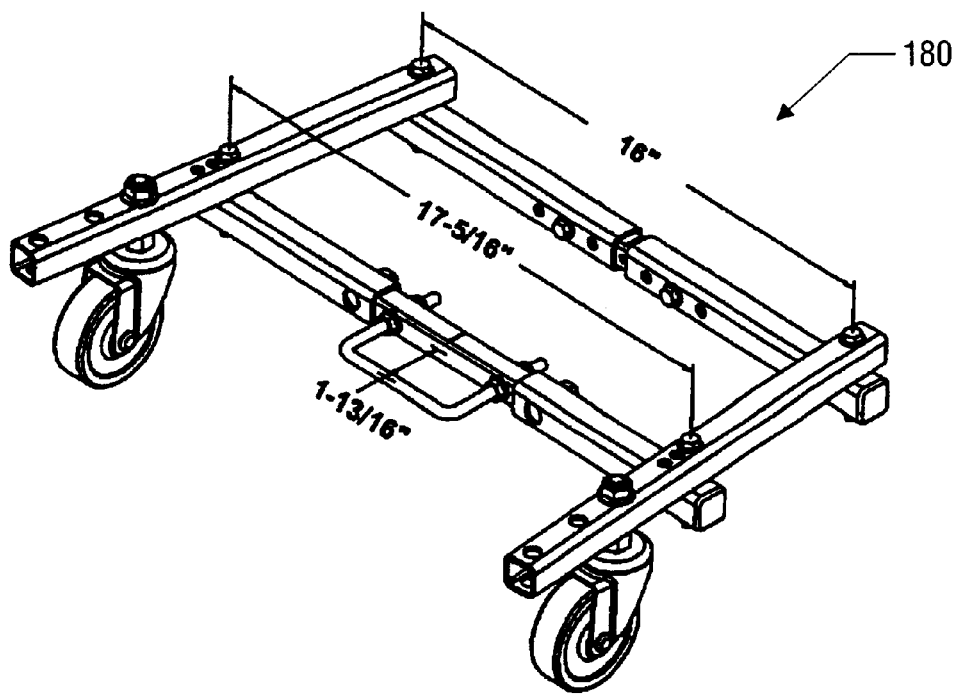
Figure 8C:
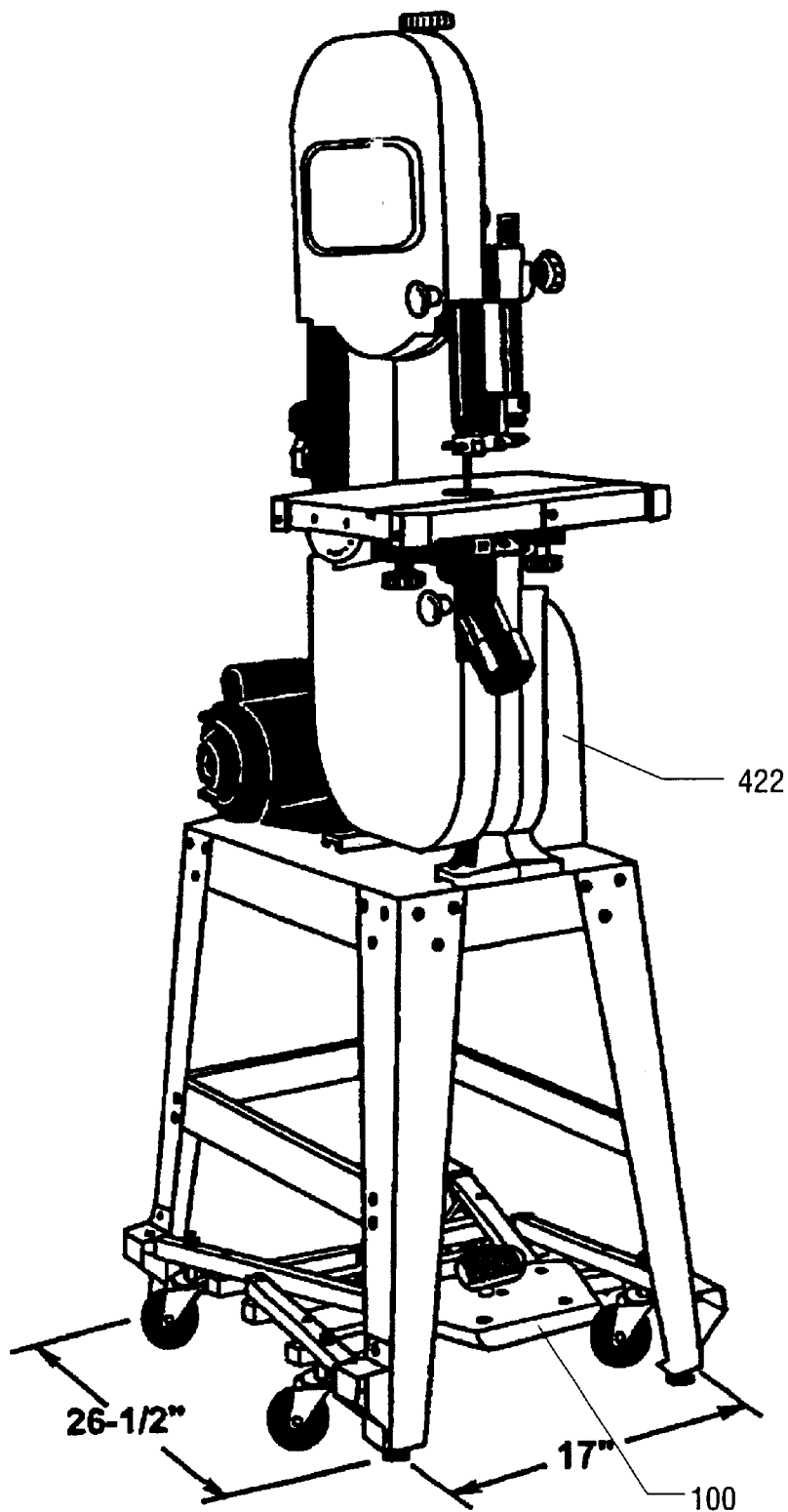
Figure 9A:
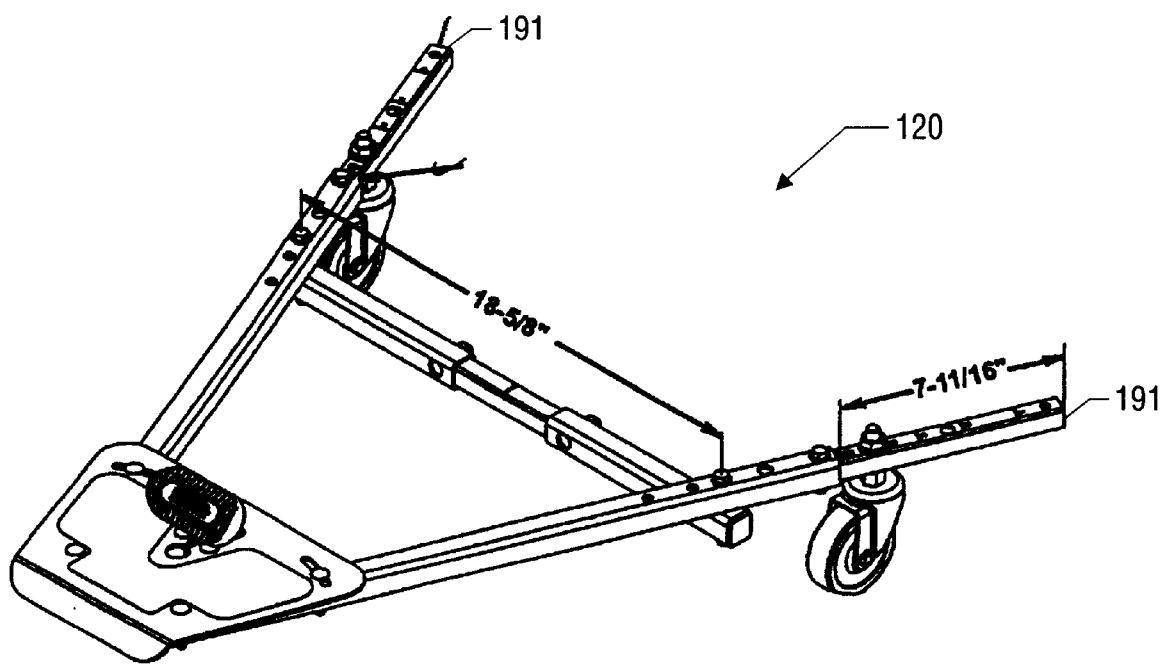
FIGS. 9A–C show the adjustable lift dolly in one given configuration for one embodiment of the present invention.
Figure 9B:
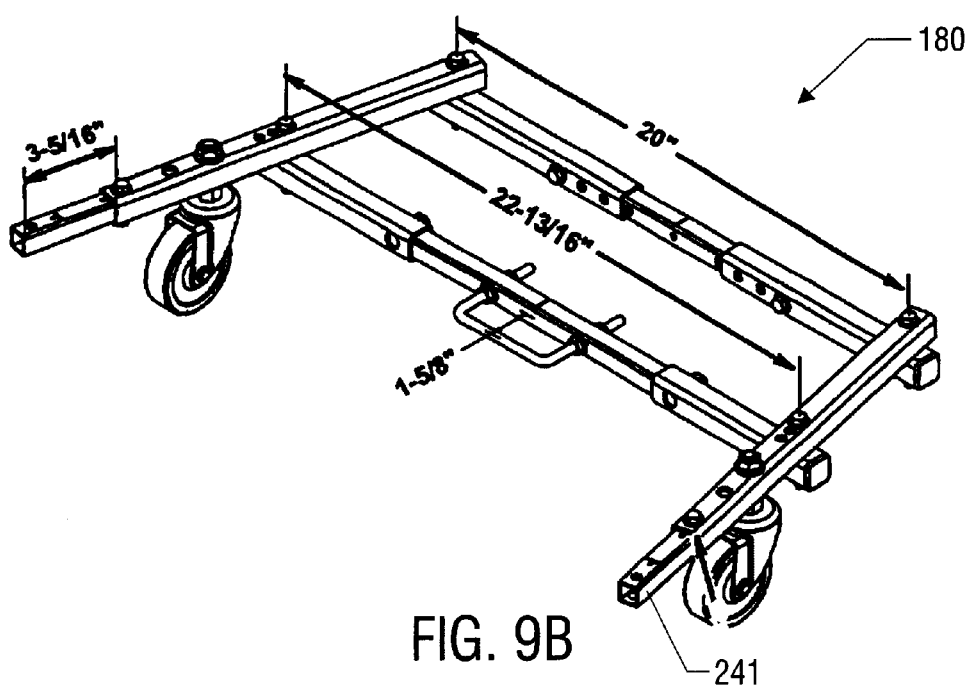
Figure 9C:
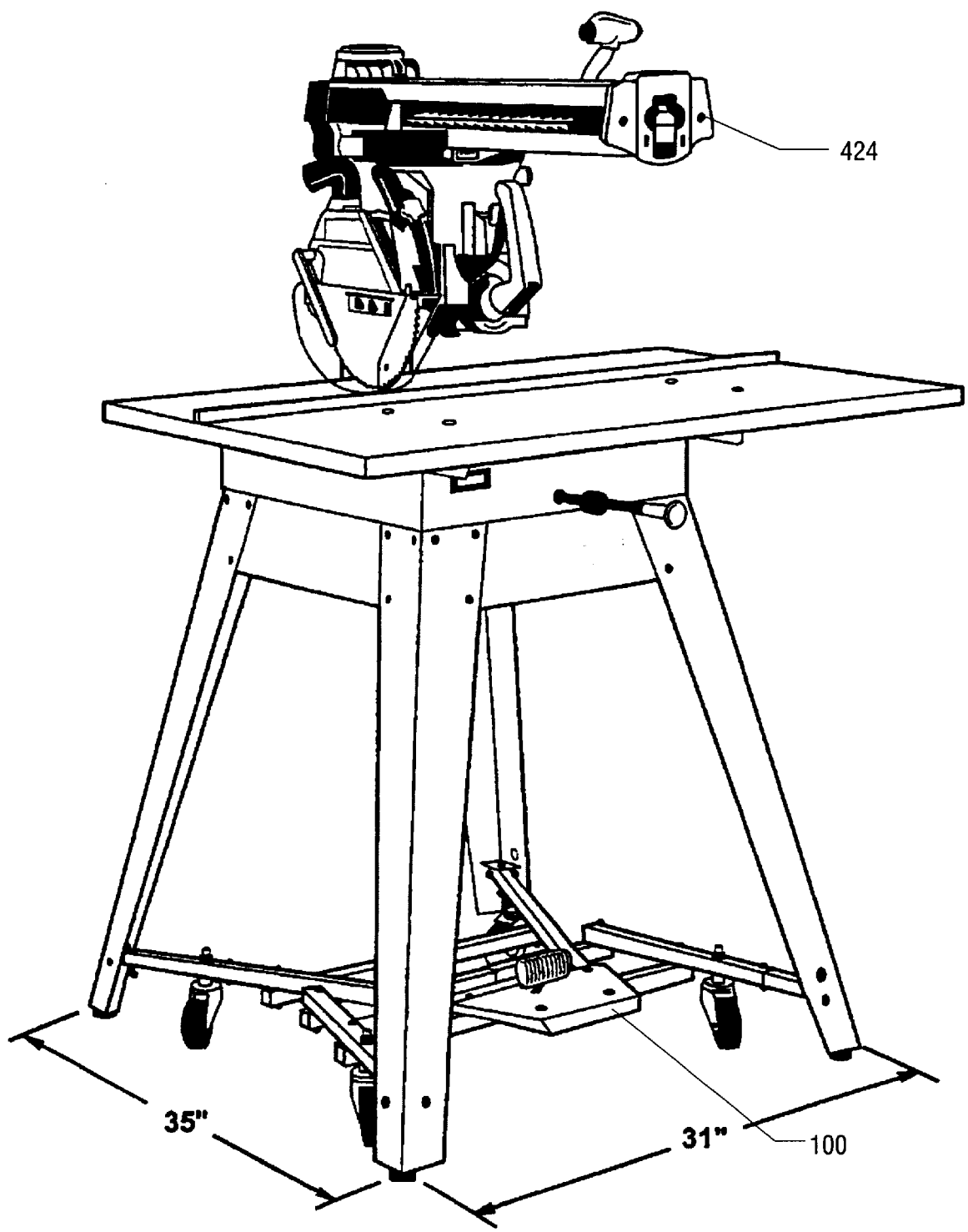
Figure 10A:
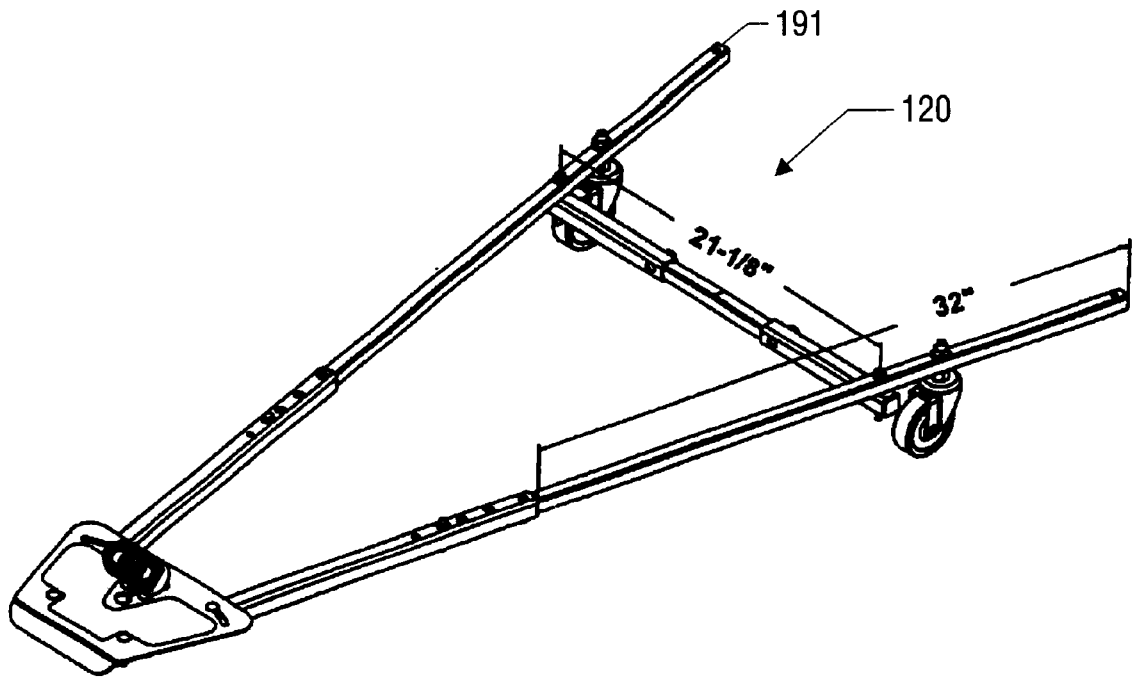
FIGS. 10A–C show the adjustable lift dolly in one given configuration for one embodiment of the present invention.
Figure 10B:
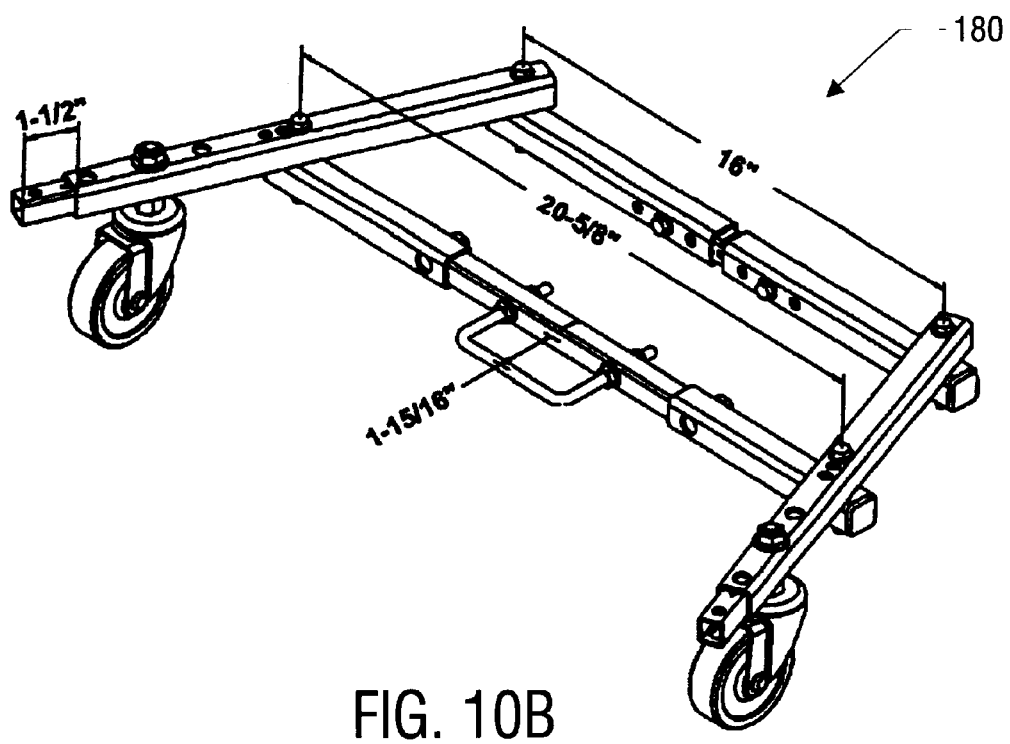
Figure 10C:
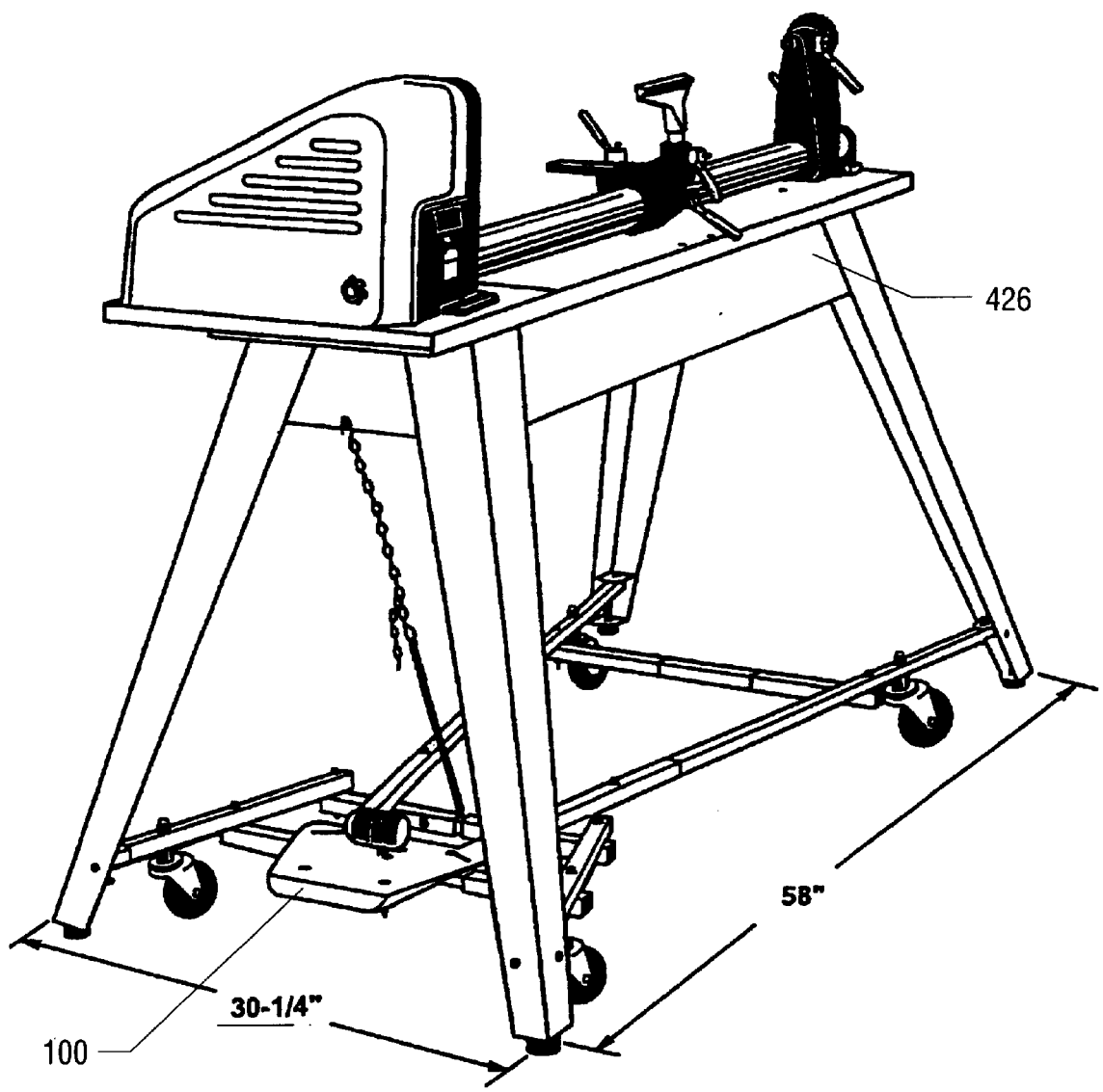

As stated above, some embodiments of the present invention include adjustable features such that the same lift dolly 100 may be utilized to lift and/or move objects of different shapes and sizes. FIGS. 7A–C show the lift dolly 100 in one configuration to lift and/or move a table saw 420. By adjusting the telescopic members, and/or moving bolts from one hole to another, and/or adding extensions to the frame, the same lift dolly 100 may be configured in a myriad of ways as is understood by one of ordinary skill in the art having the benefit of this disclosure. For example, FIGS. 8A–C show the same lift dolly 100 configured to lift and/or move a band saw 422; FIGS. 9A–C show the same lift dolly 100 configured to lift and/or move a radial saw 424; FIGS. 10A–C show the same lift dolly 100 configured to lift and/or move a wood lathe 426. In each of these figures, the dimensions are shown as examples only, as the lift dolly 100 could be configured and sized to any desired length. Table 1 which follows describes additional configurations for FIG. 14 one embodiment of the lift dolly 100 of one embodiment of the present invention.

in any suitable manner such as with bolts. Although the bracket is shown as being V-shaped, any shape could be used. Further, this bracket, whether V-shaped or not, could be integrally formed in footplate 920 bracket.

Pivotally attached to said V-shaped bracket is cam latch 940. Cam latch 940 can contact U-bolt 910 on the bottom side of footplate 920 while also extending through footplate 920 to attach to foot pedal 950 as shown in FIG. 11B. Torsion spring 980 is attached to cam latch 940 as shown.

Cam latch 940 is shown alone in FIG. 11B. As can be seen, cam latch 940 is comprised of cam engagement surface 800, cam notch 820, cam attachment means 840, and cam foot pedal support 860. Cam foot pedal support 860 is attached to foot pedal 950. In some embodiments, cam latch 940 is integral such that 100% of the force applied to foot pedal 950 is translated to cam latch engagement surface 800 thereby releasing the lift dolly from its lifted position. This integral composition of the cam latch 940's unique shape provides for a convenient method of unlocking the lift dolly in its lifted position.

FIG. 11A shows the latching mechanism with first frame 120 and second frame 180 in an unlatched or opened or non-lifting configuration. Cam latch 940 is rotatably secured to V-shape bracket 930 in this normal arrangement. Cam

TABLE 1

Universal Legset Configurations (All dimensions shown are in inches)

| Leg Dimension[1,5] Width × Depth | U-Bolt Support Assembly[2] | U-Bolt Support Location Hole # | U-Bolt Adjustment[3] | Center Support Assembly[2] | Rear Support Assembly[2] | Rear Support Assembly Hole # | Extension Position[4] Front | Rear |
|---|---|---|---|---|---|---|---|---|
| 24 × 24 | 19⅞ | 2 | 1⁵⁄₁₆ | 19 | 16⁷⁄₁₆ | 5 | | |
| 24 × 26 | 19¹³⁄₁₆ | 3 | 1⁷⁄₁₆ | 19 | 16⅝ | 4 | | A |
| 24 × 28 | 19⅞ | 1 | 1⅞ | 19 | 16⅜ | 3 | A | B |
| 25 × 25 | 20⁷⁄₁₆ | 2 | 1¾ | 19 | 17⅜ | 4 | | A |
| 25 × 27 | 20⁷⁄₁₆ | 2 | 1¾ | 19 | 17⅛ | 3 | | B |
| 25 × 29 | 20³⁄₁₆ | 3 | 1¹¹⁄₁₆ | 19 | 17⅛ | 3 | A | B |
| 26 × 24 | 21⅛ | 2 | 2 | 20 | 18⅛ | 4 | | A |
| 26 × 26 | 20¾ | 2 | 2⅛ | 19 | 18⅛ | 4 | A | A |
| 26 × 28 | 20¾ | 2 | 2⅛ | 19 | 17¹³⁄₁₆ | 3 | A | B |
| 26 × 30 | 20¾ | 2 | 1⅝ | 19 | 18¹⁄₁₆ | 2 | A | C |
| 27 × 25 | 21¹³⁄₁₆ | 3 | 1¾ | 20 | 18⅞ | 4 | | A |
| 27 × 27 | 21½ | 3 | 1¹³⁄₁₆ | 19 | 18½ | 3 | | B |
| 27 × 29 | 21½ | 2 | 2¹⁄₁₆ | 19 | 18⁵⁄₁₆ | 2 | | D |
| 27 × 31 | 21¼ | 2 | 1⁹⁄₁₆ | 19 | 18⁵⁄₁₆ | 2 | A | D |
| 28 × 24 | 23 | 2 | 2 | 21 | 19⅝ | 4 | | A |
| 28 × 26 | 22½ | 2 | 2⅛ | 20 | 19⁵⁄₁₆ | 3 | | B |
| 28 × 28 (a) | 22½ | 2 | 1¾ | 20 | 19½ | 2 | | C |
| 28 × 30 | 21½ | 3 | 1¾ | 19 | 19½ | 2 | A | C |
| 28 × 32 (b) | 21³⁄₁₆ | 3 | 1⅝ | 19 | 19½ | 2 | B | C |
| 29 × 25 | 23⁵⁄₁₆ | 3 | 1⁵⁄₁₆ | 21 | 20⅜ | 4 | | A |
| 29 × 27 | 23⁵⁄₁₆ | 3 | 1⅜ | 21 | 20 | 3 | | B |
| 29 × 29 | 22¹¹⁄₁₆ | 2 | 2 | 20 | 20⁵⁄₁₆ | 2 | A | C |
| 29 × 31 | 22 | 3 | 1¹⁵⁄₁₆ | 19 | 19¾ | 2 | A | D |
| 30 × 26 | 24 | 2 | 1⅝ | 21 | 20¾ | 3 | | B |
| 30 × 28 | 23¹³⁄₁₆ | 3 | 1⅞ | 21 | 21 | 2 | | C |
| 30 × 30 | 23¹¹⁄₁₆ | 2 | 1⅞ | 20 | 20⁷⁄₁₆ | 2 | A | D |
| 30 × 32 (c) | 22¹³⁄₁₆ | 2 | 1⅝ | 20 | 20⁷⁄₁₆ | 2 | B | D |
| 31 × 27 | 24⁹⁄₁₆ | 2 | 2 | 21 | 21¹³⁄₁₆ | 2 | | C |
| 31 × 29 | 24 | 3 | 2 | 21 | 21¾ | 2 | A | C |
| 31 × 31 | 23¹³⁄₁₆ | 2 | 1⅜ | 21 | 21¹³⁄₁₆ | 2 | B | C |
| 32 × 28 (d) | 25½ | 2 | 2 | 22 | 21⅞ | 2 | | D |
| 32 × 30 | 24⅜ | 3 | 1⅞ | 21 | 21⅞ | 2 | A | D |
| 32 × 32 | 24 | 3 | 1¹¹⁄₁₆ | 21 | 21⅞ | 2 | B | D |

Referring to FIG. 11A, the latch mechanism previously described is shown. U-bolt 910 is attached to U-bolt support assembly 220 of second frame 180. V-shaped bracket 930 is attached in this embodiment to the bottom of footplate 920 latch 940 rests against U-bolt 910. As second frame 180 engages cam latch 940, U-bolt 910 slides up cam 940 against the force of torsion spring 980. This forces cam latch 940 to rotate clockwise as seen in FIGS. 12A and 12B. Once the U-bolt 910 clears cam latch 940, torsion spring 980 causes cam latch 940 to return to its normal alignment with V-shaped bracket 930.

While torsion spring 980 is not required for the latching mechanism to function properly, the use of torsion spring 980 is advantageous because it provides a robust means to reliably rotate cam latch 940. Prior latching mechanisms have utilized regular springs in order to toggle a latch from an open to a closed position. It has been found that such a toggle mechanism is not reliable over time. Torsion spring 980, used in conjunction with V-shaped bracket 930 and cam latch 920, provides a secure, reliable method of securing the lift dolly in a raised position.

The V-shape of V-shaped bracket 930 is advantageous as it helps to guide the U-bolt 910 into the locking position. Therefore, should first frame 120 and second frame 180 be somewhat misaligned, the V-shape of V-shaped bracket 930 assists in assuring the secure connection between U-bolt 91 and V-shaped bracket 930. Again, the unique shape of cam latch 940, as shown in FIG. 11B, facilitates this locking procedure.

As shown in FIG. 13A, once first frame 120 and second frame 180 are horizontal, second frame 180 is secured to first frame 120 because U-bolt 910 is totally surrounded by cam latch 940 and V-shaped bracket latch 930.

Thus, this cam latch mechanism provides a secure method of interlocking first frame 120 and second frame 180 while heavy object 1000 is moved. Once it is desired to place object 1000 on the floor, foot pedal 950 may be depressed by applying a downward force on foot pedal 950. Cam latch 940 is again rotated clockwise against the force of torsion spring 980. This allows U-bolt 910 to be released from its secured attachment as shown in FIGS. 12A and 12B and finally in 11A and 11B.

In some embodiments, in order to provide the secure connection of the frames, and to ensure that U-bolt 910 is totally surrounded by cam latch 940 and V-shaped bracket 930, a simple but secure method of adjusting the position of U-bolt 910 relative to V-shaped bracket 930 is desirable. For example, as shown in FIG. 11A, U-bolt 910 is connected to second tube support via an adjustable means. As shown, the ends of U-bolt 910 is treaded; U-bolt support assembly 220 is provided with mating holes; and two nuts are used to secure U-bolt 910 to U-bolt support assembly 220. This adjustable connection allows a user to ensure that U-bolt 910 is properly centered in the "V" of V-shaped bracket 930 thereby providing secure connection. This is advantageous to compensate for manufacturing tolerances and wear over time of the entire lift dolly mechanism. As would be appreciated by one of ordinary skill in the art, any type of adjustable connection that allows the U-bolt 910 to move could be used.

Figure 14:
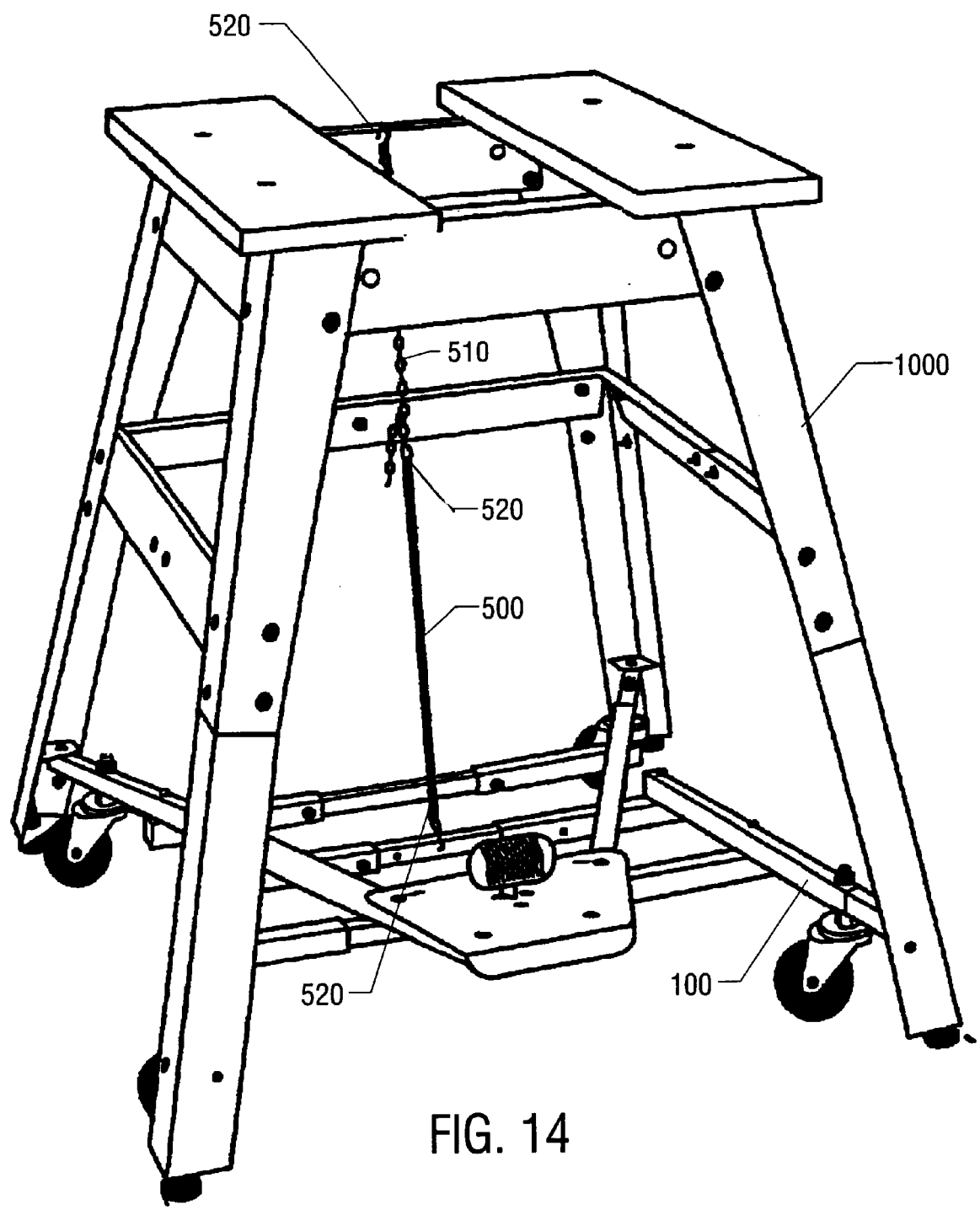
FIG. 14 shows a counterbalance of one embodiment of the present invention.
Figure 15:
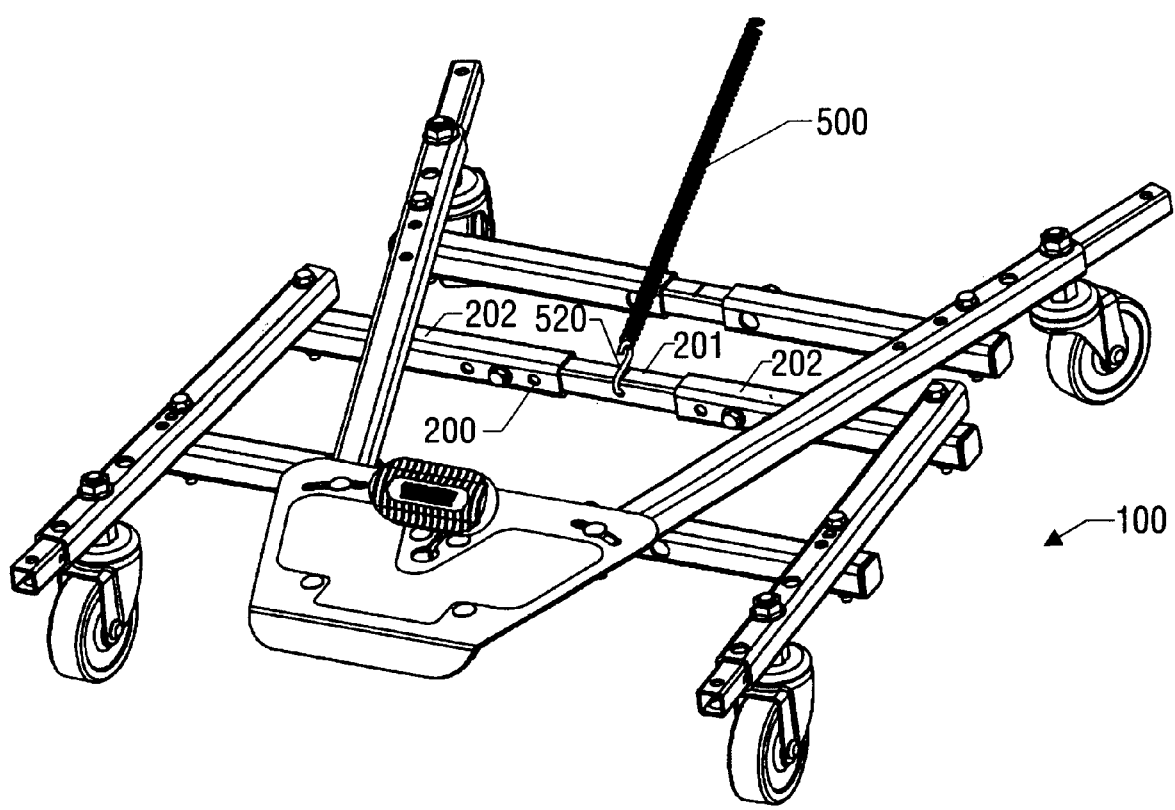
FIG. 15 shows a counterbalance of an embodiment of the present invention.

Referring to FIGS. 14 and 15, another embodiment of the present invention is disclosed. It has been discovered that in some applications, the size and weight of the first frame 120 and the second frame 180 creates a moment about the castors. This moment tends to push upwardly on the object 1000 as if it were set in a mobile position. To address this issue, some embodiments of the present invention include a counterbalance. For instance, FIGS. 14 and 15 disclose an extension spring 500 which is connected to the center support assembly 200 via s-hook 520. The other end of the spring 500 is connected to the object 1000 to be lifted via a chain 510. Because lift dolly 100 is capable of adjusting to various sizes as described above, the chain 510 and s-hooks 520 may be used in combination with the spring 500 to provide a convenient way of controlling the amount of tension in the spring 500.

In operation, one end of the chain 510 is secured to the object 1000. The spring 500 is releaseably secured to a selected link on the other end of the chain 510 using s-hook 520. The other end of the spring 500 is connected to the center support assembly 200 via another s-hook 520. The tension in the spring 500 may be adjusted as required by selecting a different link in the chain 510 to which the spring 500 is mounted.

Although various embodiments have been shown and described, the invention is not so limited and will be understood to include all such modifications and variations as would be apparent to one skilled in the art.

The following table lists the description and the numbers as used herein and in the drawing attached hereto.

| | |
|---|---|
| 100 | Lift Dolly |
| 120 | First Frame |
| 140 | Apex End |
| 160 | Rear Support Assembly |
| 161 | Rear Member |
| 162 | First Mounting Member |
| 163 | Hex nut/Set Screw |
| 180 | Second frame |
| 190 | Second Frame Side |
| 191 | Second Frame Side Extension |
| 200 | Center Support Assembly |
| 203 | Lock Nut |
| 220 | U-bolt Support Assembly |
| 240 | First Frame Side |
| 241 | First Frame Side Extension |
| 280 | Castor stems |
| 300 | Castor |
| 310 | First Pivot End |
| 320 | Second Pivot End |
| 380 | Anchor plate |
| 400 | Outward Extruded Hole |
| 401 | Clearance Hole |
| 410 | Slots |
| 412 | Nuts and Bolts |
| 420 | Table Saw |
| 422 | Band Saw |
| 424 | Radial Saw |
| 426 | Wood Lathe |
| 500 | Spring |
| 510 | Chain |
| 520 | S-Hook |
| 800 | Cam Engagement Surface |
| 820 | Cam Notch |
| 840 | Cam Attachment Means |
| 860 | Cam Foot Pedal Support |
| 910 | U-Bolt |
| 920 | Footplate |
| 921 | Slot |
| 930 | V-shaped bracket |
| 940 | Cam latch |
| 950 | Foot pedal |
| 980 | Torsion spring |
| 1000 | Object (to be lifted) |

What is claimed is:

1. An adjustable lift dolly for lifting and moving objects of different sizes comprising:

an adjustable first frame having an apex, a rear support assembly with an adjustable length, a plurality of first pivot ends connectable to the object, and a first pair of castors extending downwardly from the adjustable first frame;

an adjustable second frame having a center support assembly with an adjustable length, a U-bolt support assembly having an adjustable length, a plurality of second pivot ends connectable to the object, and a second pair of castors extending downwardly from the second frame;

a latching mechanism for releasably securing the adjustable first frame to the adjustable second frame, having a footplate attached to said first frame, the adjustable first frame being connectable to the adjustable second frame such that when a downward force is exerted on the apex of the adjustable first frame, the adjustable first frame pivots relative to the first pair of castors thus moving the first pivot ends of the adjustable first frame in an upward direction, said downward force on the adjustable first frame causing the adjustable first frame to exert a downward force on the center support assembly of the second frame, thus causing the second frame to pivot relative to the second pair of castors, thus moving the second pivot ends of the adjustable second frame in an upward direction, the upward movement of the of the first and second pivot ends thereby lever-lifting the object; and a foot pedal attached to the latching mechanism, the foot pedal being functionally associated with the latching mechanism such that by depressing the foot pedal, the latching mechanism disconnects the first frame from the second frame, wherein at least one of the lengths of the rear support assembly, center support assembly, or U-bolt support assembly is varied to accommodate objects of different sizes.

2. The adjustable lift dolly of claim 1 in which the rear support assembly further comprises:

a rear member having two ends; and a plurality of first mounting members attached to the first frame, each end of the rear member being releaseably, telescopically mounted within one of the plurality of first mounting members such that the length of the rear support assembly may be varied.

3. The adjustable lift dolly of claim 2 in which the rear member is releaseably, telescopically mounted within one of the plurality of first mounting members by adjusting means for adjusting the length of the rear support assembly.

4. The adjustable lift dolly of claim 3 in which the adjusting means comprises an outward extruded hole in the plurality of first mounting members, a set screw and a lock nut being threaded into the tapped, outward extruded hole to contact the rear member.

5. The adjustable lift dolly of claim 4 in which the first adjustable frame further comprises:

a plurality of first frame sides, each having an adjustable length.

6. The adjustable lift dolly of claim 5 in which each of the plurality of first mounting members are selectively secured to the first plurality of first frame sides by attachment means.

7. The adjustable lift dolly of claim 6 in which the attachment means further comprises each first frame side comprising a plurality of holes that mate with a hole with each of the first mounting members.

8. The adjustable lift dolly of claim 5 in which each first frame side further comprises an extension telescopically mountable within each first frame side.

9. The adjustable lift dolly of claim 1 in which the center support assembly further comprises:

a center support member having two ends; and a plurality of second mounting members attached to the second frame, each end of the center support member being releaseably, telescopically mounted within one of the plurality of second mounting members such that the length of the center support assembly may be varied.

10. The adjustable lift dolly of claim 9 in which the center support member is releaseably, telescopically mounted within one of the plurality of second mounting members by adjusting means for adjusting the length of the center support assembly.

11. The adjustable lift dolly of claim 10 in which the adjusting means comprises an outward extruded hole in the plurality of second mounting members, a set screw and a lock nut being threaded into the tapped, outward extruded hole to selectively contact the center support member.

12. The adjustable lift dolly of claim 11 in which each of the plurality of second mounting members is provided with a plurality of holes into which a screw and a second lock nut may be inserted to selectively secure the center support member within the second mounting members.

13. The adjustable lift dolly of claim 1 in which the U-bolt support assembly further comprises:

a U-bolt support member having two ends; and a plurality of third mounting members attached to the second frame, each end of the U-bolt support member being releaseably, telescopically mounted within one of the plurality of third mounting members such that the length of the U-bolt support assembly is adjustable.

14. The adjustable lift dolly of claim 13 in which the U-bolt support member is releaseably, telescopically mounted within one of the plurality of third mounting members by adjusting means for adjusting the length of the U-bolt support assembly.

15. The adjustable lift dolly of claim 14 in which the adjusting means comprises an outward extruded hole in the plurality of third mounting members, a set screw and lock nut being threaded into the tapped, outward extruded hole to selectively contact the U-bolt support member.

16. The adjustable lift dolly of claim 15 in which the second adjustable frame further comprises a plurality of second frame sides, each having a plurality of holes, each third mounting member being connected to each second frame side by passing a bolt through the mounting member and into one of the plurality of holes in the second frame side.

17. The adjustable lift dolly of claim 12 in which the second adjustable frame further comprises:

a plurality of second frame sides, each having an adjustable length.

18. The adjustable lift dolly of claim 17 in which each of the plurality of second mounting members are releasably secured to the second plurality of second frame sides by attachment means.

19. The adjustable lift dolly of claim 18 in which the attachment means further comprises each second frame side comprising a plurality of holes that mate with a hole with each of the second mounting members.

20. The adjustable lift dolly of claim 12 in which each second frame side further comprises an extension telescopically mountable within each second frame side.

21. The adjustable lift dolly of claim 20 in which footplate comprises a slot to allow the lift dolly to accommodate objects of different sizes.

22. The adjustable lift dolly of claim 21 wherein the footplate is movably mounted to the first plurality of first frame sides via the slots to allow the lift dolly to accommodate objects of different sizes.

23. The adjustable lift dolly of claim 1 further comprising a counterbalance.

24. The adjustable lift dolly of claim 23 in which the counterbalance further comprises a spring connected to the center support assembly and connectable to the object to bias the lift dolly from applying the upward movement to lever lift the object.

25. The adjustable lift dolly of claim 23 in which the spring is connectable to the object via an s-hook passing through one of a plurality of links in a chain, the tension in the spring being adjustable by moving the s-hook into another one of the plurality of links in the chain.

26. The adjustable lift dolly of claim 1 wherein the latching mechanism further comprises:
   a bracket mounted to the footplate, said bracket extending downwardly from said footplate;
   a cam latch rotatably mounted to said bracket; and
   a U-bolt attached to the U-bolt support assembly on the adjustable second frame,
      the foot pedal attached to the cam latch, the foot pedal being functionally associated with the cam latch such that by depressing the foot pedal, the cam latch rotates to release the U-bolt thereby disconnecting the first frame from the second frame.

27. A method of lifting and moving a first object from a first location to a second location, and lifting and moving a second object from a third location to a fourth location, comprising
   a) providing an adjustable lift dolly having
      an adjustable first frame having an apex, a rear support assembly with an adjustable length, a plurality of first pivot ends of the rear support assembly connectable to the object, and a first pair of castors extending downwardly from the adjustable first frame;
      an adjustable second frame having a center support assembly with an adjustable length, a U-bolt support assembly having an adjustable length, a plurality of second pivot ends connectable to the object, and a second pair of castors extending downwardly from the second frame;
      a latching mechanism for releasably securing the adjustable first frame to the adjustable second frame, having a footplate attached to said first frame, the adjustable first frame being connectable to the adjustable second frame such that when a downward force is exerted on the apex of the adjustable first frame, the adjustable first frame pivots relative to the first pair of castors thus moving the first pivot ends of the adjustable first frame in an upward direction, said downward force on the adjustable first frame causing the adjustable first frame to exert a downward force on the center support assembly of the second frame, thus causing the second frame to pivot relative to the second pair of castors, thus moving the second pivot ends of the adjustable second frame in an upward direction, the upward movement of the of the first and second pivot ends thereby lever-lifting the object; and
      a foot pedal attached to the latching mechanism, the foot pedal being functionally associated with the latching mechanism such that by depressing the foot pedal, the latching mechanism disconnects the first frame from the second frame,
         wherein at least one of the lengths of the rear support assembly, center support assembly, or U-bolt support assembly is varied to accommodate to objects of different sizes;
   b) connecting the first pivot ends of the first frame to the first object;
   c) connecting the second pivot ends of the second frame to the first object;
   d) lever-lifting the first object by exerting a downward force on the apex and articulating the second frame by contacting said center support assembly until the latching mechanism is secured on a U-bolt of the U-bolt support assembly;
   e) moving the first object to the second location by exerting a horizontal force on the first object;
   f) releasing the latching mechanism by exerting a downward force on the foot pedal to allow the latching mechanism to disconnect the first frame from the second frame thereby lowering the first object at the second location;
   g) moving the lift dolly to the second object at the third location;
   h) adjusting at least one of the lengths of the center support assembly, U-bolt support assembly, or rear support assembly to accommodate a second object having a size different than a size of the first object;
   i) connecting the first pivot ends of the triangular first frame to the second object;
   j) connecting the second pivot ends of the second frame to the second object;
   k) lever-lifting the second object by exerting a downward force on the apex and articulating the second frame by contacting the center support assembly until the latching mechanism is secured on the U-bolt of the U-bolt support;
   l) moving the second object to the fourth location by exerting a horizontal force on the second object; and
   m) releasing the latching mechanism by exerting a downward force on the foot pedal to allow the latching mechanism to disconnect the first frame from the second frame thereby lowering the second object at the fourth location.

28. An adjustable lift dolly for lifting and moving objects of different sizes comprising:
   an adjustable first frame having an apex, a rear support assembly with an adjustable length, a plurality of first frame sides each having an adjustable length, a plurality of first pivot ends connectable to the object, and a first pair of castors extending downwardly from the adjustable first frame, the rear support assembly further having a rear member having two ends and a plurality of first mounting members attached to the first frame, each end of the rear member being releaseably, telescopically mounted within one of the plurality of first mounting members such that the length of the rear support assembly is adjustable, by adjusting means for adjusting the length of the rear support assembly, the adjusting means comprising an outward extruded hole in the plurality of first mounting members, a set screw and a second lock nut being threaded into the tapped, outward extruded hole to contact the rear member, each of the plurality of first mounting members being selectively secured to the first plurality of first frame sides by attachment means with each first frame side comprising a plurality of holes that mate with a hole with each of the first mounting members,
      each first frame side further having an extension telescopically mountable within each first frame side;
   an adjustable second frame having a center support assembly with an adjustable length, a U-bolt support assembly having an adjustable length, a plurality of second pivot ends connectable to the object, and a second pair of castors extending downwardly from the second frame, the center support assembly having a center support member having two ends and a plurality of second mounting members attached to the second frame, each end of the center support member being releaseably, telescopically mounted within one of the plurality of second mounting members such that the length of the center support assembly may be varied by adjusting means for adjusting the length of the center support assembly, the adjusting means being an outward extruded hole in the plurality of second mounting members, a set screw and a lock nut being threaded into the tapped, outward extruded hole to selectively contact the center support member, the plurality of second mounting members provided with a plurality of holes into which a screw and a second lock nut may be inserted to selectively secure the center support member within the second mounting members, the U-bolt support assembly having a U-bolt support member with two ends and a plurality of third mounting members attached to the second frame, each end of the U-bolt support member being releaseably, telescopically mounted within one of the plurality of third mounting members such that the length of the U-bolt support assembly is adjustable by adjusting means for adjusting the length of the U-bolt support assembly, the adjusting means being an outward extruded hole in the plurality of third mounting members, a set screw and a lock nut being threaded into the tapped, outward extruded hole to selectively contact the U-bolt support member, the second adjustable frame having a plurality of second frame sides, each having a plurality of holes, each third mounting member being connected to each second frame side by passing a bolt through the mounting member and into one of the plurality of holes in the second frame side, each second frame side having an adjustable length, each of the plurality of second mounting members being releasably secured to the second plurality of second frame sides by attachment means comprising each second frame side comprising a plurality of holes that mate with a hole with each of the second mounting members, each second frame side having an extension telescopically mountable within each second frame side;

a counterbalance comprising a spring connected to the center support assembly and connectable to the object to bias the lift dolly from applying the upward movement to lever lift the object, the spring being connectable to the object via an s-hook passing through one of a plurality of links in a chain, the tension in the spring being adjustable by moving the s-hook into another one of the plurality of links in the chain;

a latching mechanism for releasably securing the adjustable first frame to the adjustable second frame, having a footplate attached to said first frame, the adjustable first frame being connectable to the adjustable second frame such that when a downward force is exerted on the apex of the adjustable first frame, the adjustable first frame pivots relative to the first pair of castors thus moving the first pivot ends of the adjustable first frame in an upward direction, said downward force on the adjustable first frame causing the adjustable first frame to exert a downward force on the center support assembly of the second frame, thus causing the second frame to pivot relative to the second pair of castors, thus moving the second pivot ends of the adjustable second frame in an upward direction, the upward movement of the of the first and second pivot ends thereby lever-lifting the object the latching mechanism comprising a bracket mounted to the footplate, said bracket extending downwardly from said footplate, the footplate having slots to allow the lift dolly to accommodate objects of different sizes, a cam latch rotatably mounted to said bracket, a U-bolt attached to the U-bolt support assembly on the adjustable second frame, the foot pedal attached to the cam latch, the foot pedal being functionally associated with the cam latch such that by depressing the foot pedal, the cam latch rotates to release the U-bolt thereby disconnecting the first frame from the second frame; and a foot pedal attached to the latching mechanism, the foot pedal being functionally associated with the latching mechanism such that by depressing the foot pedal, the latching mechanism disconnects the first frame from the second frame.

\* \* \* \* \*